(12) United States Patent
Jayamohan et al.

(10) Patent No.: US 8,473,964 B2
(45) Date of Patent: Jun. 25, 2013

(54) TRANSPARENT USER MODE SCHEDULING ON TRADITIONAL THREADING SYSTEMS

(75) Inventors: Ajith Jayamohan, Redmond, WA (US);
Arun U. Kishan, Bellevue, WA (US);
Dave Probert, Woodinville, WA (US);
Pedro Teixeira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 12/242,648

(22) Filed: Sep. 30, 2008

(65) Prior Publication Data
US 2010/0083275 A1     Apr. 1, 2010

(51) Int. Cl.
*G06F 3/00* (2006.01)
*G06F 9/46* (2006.01)

(52) U.S. Cl.
USPC .......................................... 719/310; 718/108

(58) Field of Classification Search
USPC ............................ 719/328, 330, 310; 718/108
See application file for complete search history.

(56) References Cited

U.S. PATENT DOCUMENTS

| | | | |
|---|---|---|---|
| 5,481,719 A | 1/1996 | Ackerman et al. | |
| 5,758,184 A | 5/1998 | Lucovsky et al. | |
| 5,872,963 A | 2/1999 | Bitar et al. | |
| 6,189,023 B1 | 2/2001 | Emlich et al. | |
| 6,289,369 B1 | 9/2001 | Sundaresan | |
| 6,349,355 B1 | 2/2002 | Draves et al. | |
| 6,560,626 B1 | 5/2003 | Hogle et al. | |
| 6,578,055 B1 * | 6/2003 | Hutchison et al. | 705/3 |
| 6,611,878 B2 | 8/2003 | De Armas et al. | |
| 6,732,138 B1 * | 5/2004 | Browning et al. | 718/102 |
| 6,766,515 B1 | 7/2004 | Bitar et al. | |
| 7,100,172 B2 | 8/2006 | Voellm et al. | |
| 7,114,164 B2 | 9/2006 | Smith et al. | |
| 7,178,062 B1 * | 2/2007 | Dice | 714/38.13 |
| 7,269,722 B1 * | 9/2007 | Neary | 713/1 |
| 7,275,247 B2 | 9/2007 | Mendoza et al. | |
| 7,302,613 B2 | 11/2007 | Bliss et al. | |
| 7,373,640 B1 | 5/2008 | English et al. | |
| 7,814,549 B2 * | 10/2010 | Park | 726/24 |
| 8,006,246 B2 * | 8/2011 | Kwon | 718/102 |
| 8,010,822 B2 | 8/2011 | Marshall et al. | |
| 8,051,418 B1 | 11/2011 | Dice | |
| 2004/0252709 A1 * | 12/2004 | Fineberg | 370/412 |
| 2005/0197815 A1 * | 9/2005 | Grebenev | 703/14 |
| 2005/0229258 A1 * | 10/2005 | Pigin | 726/27 |

(Continued)

FOREIGN PATENT DOCUMENTS

| | | |
|---|---|---|
| WO | WO0062160(A2) | 10/2000 |
| WO | WO2007017683 A1 | 2/2007 |

OTHER PUBLICATIONS

Richard P. Draves, Using Continuations to Implement Thread Management and Communication in Opearating Systems, 1991.*

(Continued)

*Primary Examiner* — Lechi Truong
(74) *Attorney, Agent, or Firm* — Lee & Hayes, PLLC

(57) ABSTRACT

Embodiments for performing cooperative user mode scheduling between user mode schedulable (UMS) threads and primary threads are disclosed. In accordance with one embodiment, an asynchronous procedure call (APC) is received on a kernel portion of a user mode schedulable (UMS) thread. The status of the UMS thread as it is being processed in a multi-processor environment is determined. Based on the determined status, the APC is processed on the UMS thread.

19 Claims, 18 Drawing Sheets

U.S. PATENT DOCUMENTS

| | | | |
|---|---|---|---|
| 2005/0289545 A1* | 12/2005 | Blinick et al. | 718/100 |
| 2006/0075404 A1 | 4/2006 | Rosu et al. | |
| 2006/0123148 A1* | 6/2006 | Callender et al. | 710/14 |
| 2007/0074217 A1 | 3/2007 | Rakvic et al. | |
| 2007/0124729 A1 | 5/2007 | Ko et al. | |
| 2007/0130569 A1 | 6/2007 | Heffley et al. | |
| 2007/0271450 A1 | 11/2007 | Doshi et al. | |
| 2008/0040800 A1* | 2/2008 | Park | 726/22 |

OTHER PUBLICATIONS

Draves et al., "Unifying the User and Kernel Enviroments", Microsoft Research, Technical Report MSR-TR-97-10, Mar. 12, 1997, 18 pages.

Non-Final Office Action for U.S. Appl. No. 12/242,566, mailed on Nov. 28, 2011, Aijth Jayamohan et al., "Intelligent Context Migration for User Mode Scheduling", 20 pages.

Anderson et al., "Scheduler Activations: Effective Kernel Support for the User-Level Management of Parallelism" retrieved on Jun. 4, 2008 at <<.cs.pdx.edu/~walpole/class/cs533/winter2006/slides/72.ppt>>, Proc 13th ACM Symposium on Operating Systems Principles, Oct. 1991, 19 pgs.

Armand et al., "Multi-threaded Processes in CHORUS/MIX", retrieved on Jun. 4, 2008 at <<.teaser.fr/~pleonard/publications/chorus/CS-TR-89-37.pdf>>, Proceedings of the EEUG Spring '90 Conference, Munich, Germany, Apr. 1990, 16 pgs.

Duffy, "Concurrency and the Impact on Reusable Libraries", retrieved Jun. 5, 2008 at <<.bluebytesoftware.com/blog/PermaLink,guid,f8404ab3-e3e6-4933-a5bc-b69348deedba.aspx>>, Bluebytesoftware, Joe Duffy's Weblog, Oct. 26, 2006, pp. 1-20.

Henderson, "Inside the SQL Server 2000 User Mode Scheduler", retrieved on Jun. 6, 2008 at <<http://msdn.microsoft.com/en-us/library/aa175393.aspx>>, Microsoft Corporation, Feb. 2004, 8 pgs.

"INFO: Managing Thread Termination", retrieved Jun. 5, 2008 at <<http://support.microsoft.com/kb/254956>>, Microsoft Support, Feb. 2007, pp. 1-2.

Marsh et al., "First-Class User-Level Threads" retrieved on Jun. 4, 2008 at <<-cse.ucsd.edu/classes/wi01/cse221/marsh,scott,leblanc,markatos.first-class_user-level_threads.pdf>>, ACM SIGOPS Operating Systems Review, vol. 25, Issue 5, Oct. 1991, 12 pgs.

"Scheduling, Thread Context, and IRQL", retrieved Jun. 5, 2008 at <<http://msdn.microsoft.com/en-us/library/ms810029.aspx>>, Microsoft, Jul. 2004, pp. 1-18.

* cited by examiner

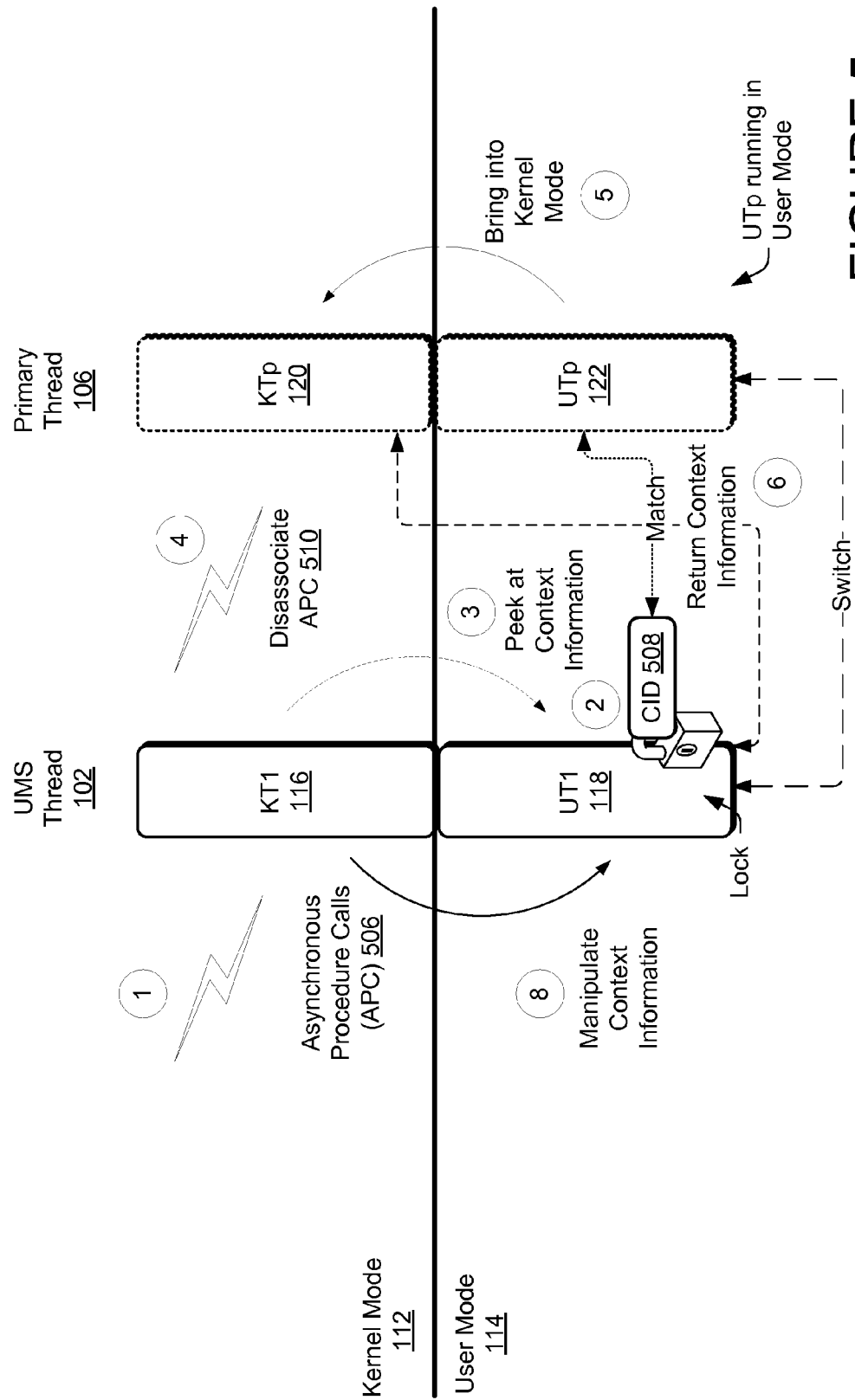

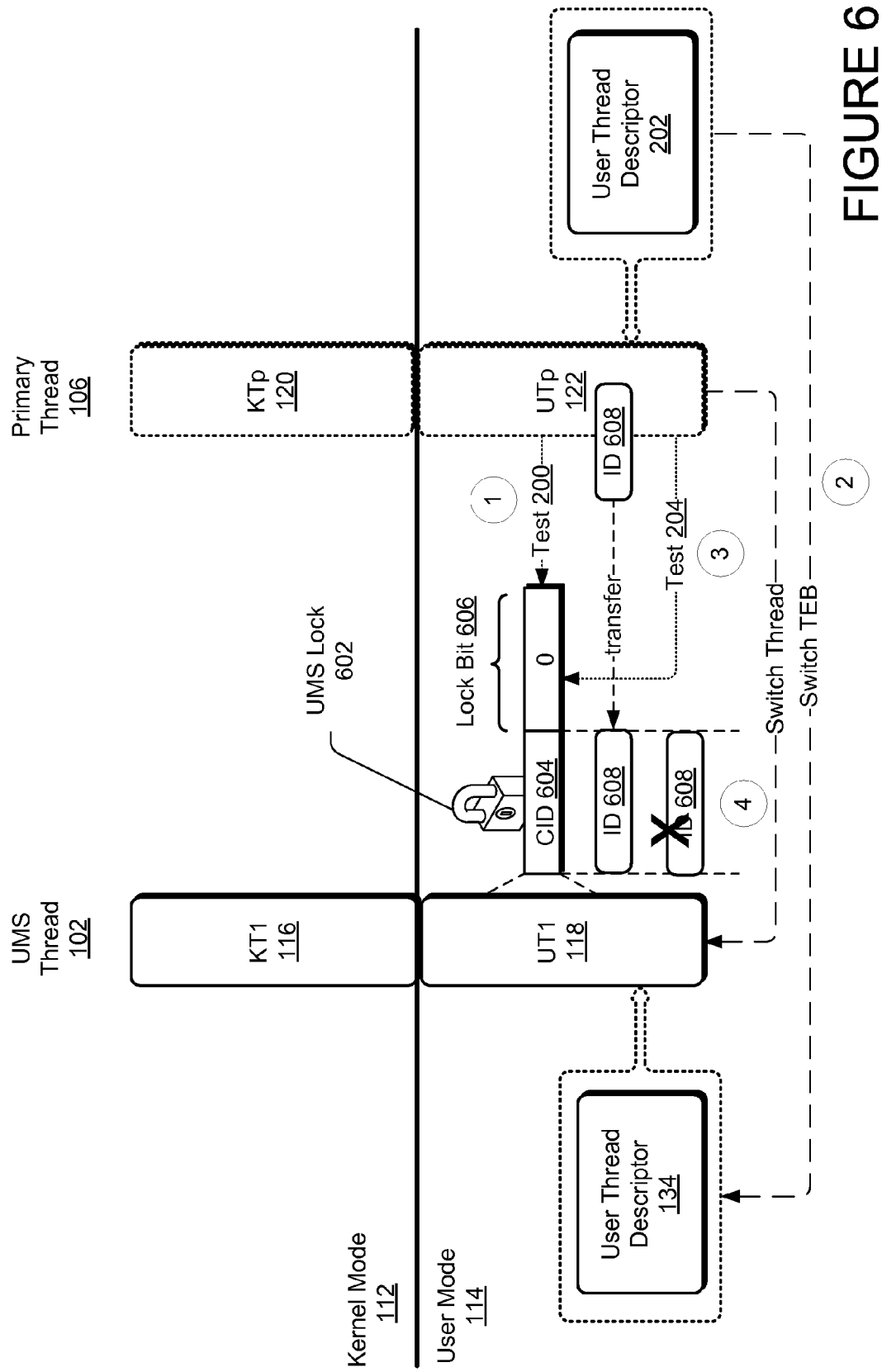

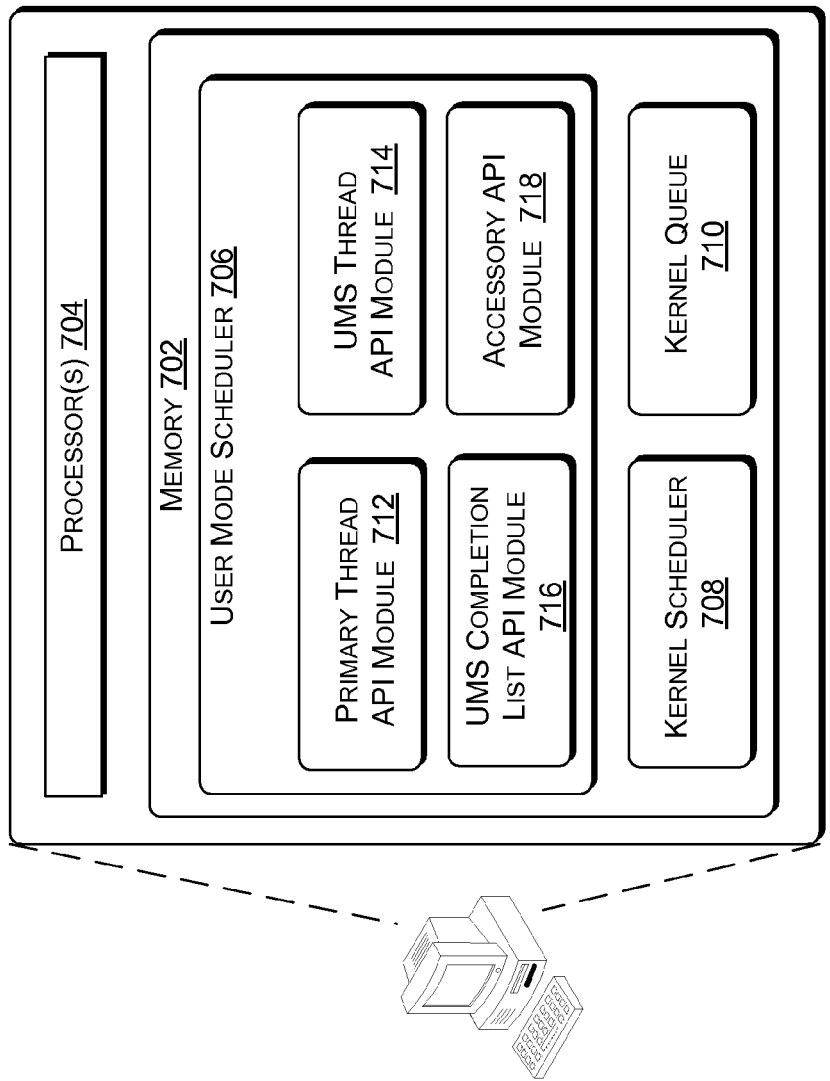

TRANSPARENT USER MODE SCHEDULING ON TRADITIONAL THREADING SYSTEMS

CROSS REFERENCE TO RELATED APPLICATIONS

This application is related to concurrently-filed U.S. patent application Ser. No. 12/242,566, entitled "Intelligent Context Migration for User Mode Scheduling," which is incorporated herein by reference.

BACKGROUND

User mode scheduling enables processes to switch user threads for better concurrency and control. User mode schedulable (UMS) threads are divided into distinct user and kernel portions. However, the division of a UMS threads into a user portion and kernel portion may cause difficulties during thread execution.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for cooperative user mode scheduling for the proper execution of UMS threads. In one embodiment, an asynchronous procedure call (APC) is received on a kernel portion of a user mode schedulable (UMS) thread. The status of the UMS thread as it is being processed in a multi-processor environment is determined. Based on the determined status, the APC is processed on the UMS thread. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 5a-5f illustrate the occurrence of an asynchronous procedure call (APC) event during the execution of user mode schedulable (UMS) threads, in accordance with various embodiments.

FIG. 6 illustrates the use of a UMS lock that includes a client identifier (CID) and a lock bit during the switching between the user portions of a primary thread and a UMS thread, in accordance with various embodiments.

FIG. 7 is a block diagram illustrating selected components of a multi-processor environment that implements mechanisms of user mode schedulable (UMS) threads execution, in accordance with various embodiments.

DETAILED DESCRIPTION

This disclosure is directed to embodiments of directed switches for the proper execution of user mode schedulable (UMS) threads. In a multi-processor environment, the UMS threads are program threads that may be executed by one or more central processor units (CPUs) in the context of an operating system process. The UMS threads are similar to processor threads currently in use on computing platforms in that each UMS thread includes a kernel portion and a user portion.

The execution of a typical process thread may involve the recurring processing of the kernel portion of the thread in kernel mode, in conjunction with the recurring processing of the user portion in user mode, and the automatic switching between the two modes. In contrast, due to the unique architecture of the computing platform on which the UMS threads are executed, the UMS threads do not generally alternate automatically between user and kernel modes. Instead, the user portions of UMS threads are "switched" with the user portions of special threads, which are referred to herein as primary threads. In turn, the user portions of the primary threads may then be executed in user mode. However, this "substitution" of a user portion of a primary thread for a user portion of a UMS thread may create a mismatch in identities. This identity mismatch between the user portion of the UMS thread and the primary thread kernel portion may occur once the primary thread executing on behalf of the user portion of the UMS thread returns to kernel mode. Accordingly, a process referred to as a "directed switch" may be performed to remedy such mismatches and provide smooth transition between the user and kernel portions of the UMS thread.

In some instances, the implementation of such "directed switches" may make it necessary to implement certain support mechanisms and processes. The embodiments described herein are directed to these support mechanisms and processes that work cooperatively to support directed switches. Accordingly, various examples of these mechanisms and processes that support directed switches are described below with reference to FIGS. 1-11.

Exemplary Schemes

Figure 1:
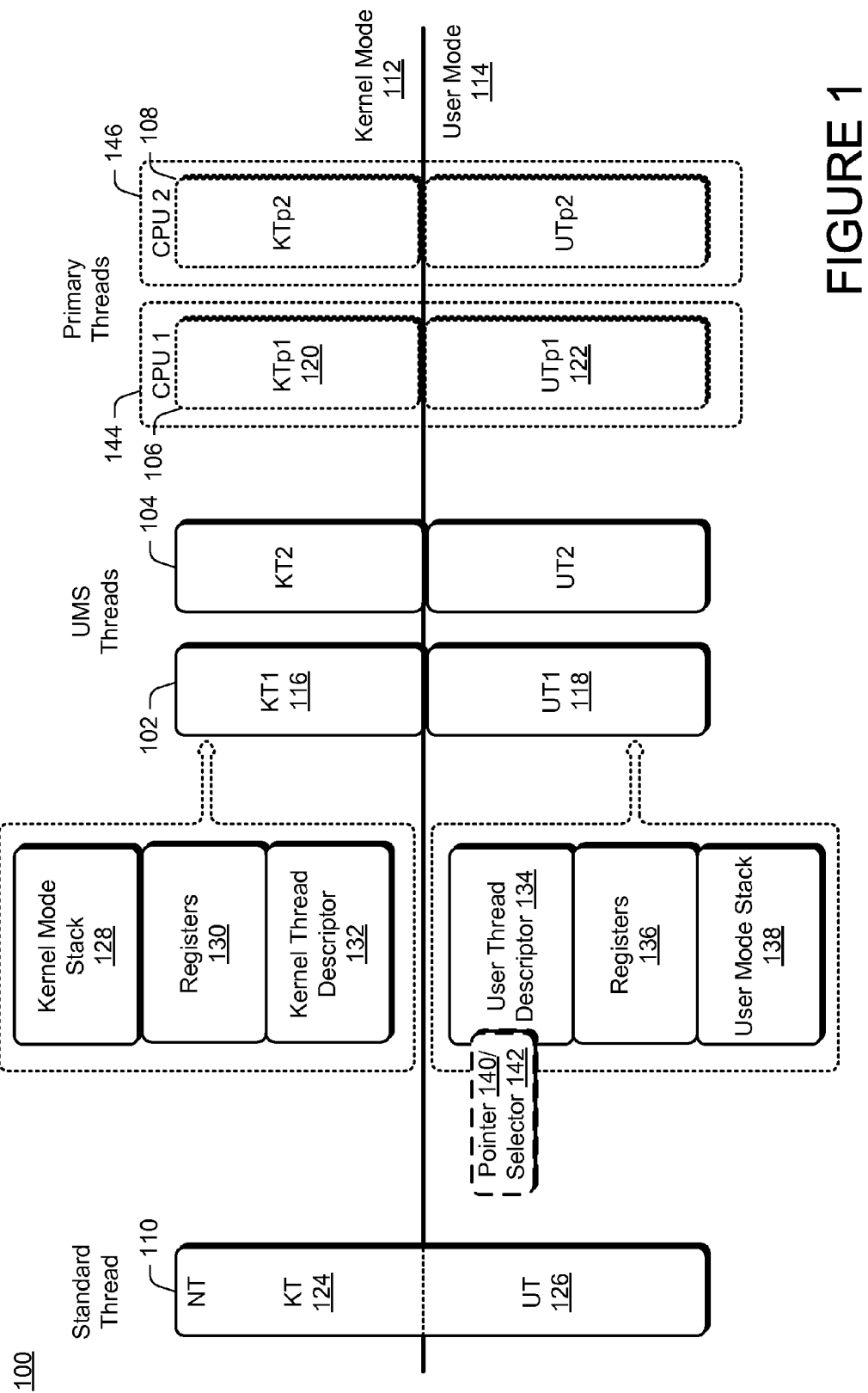
FIG. 1 is a block diagram illustrating an exemplary multi-processor environment for the execution of user mode schedulable (UMS) threads, in accordance with various embodiments.

FIG. 1 is a block diagram illustrating an exemplary multi-processor environment 100 for the execution of user mode schedulable (UMS) threads, in accordance with various embodiments. As shown, the exemplary multi-processor environment 100 may include one or more UMS threads, such as UMS thread 102 and 104, one or more primary threads, such as primary threads 106 and 108, and one or more standard threads, such a process thread 110. In various embodiments, the process thread 110 may be a NT thread that is part of the Windows NT® computing environment.

Each of the threads in the exemplary multi-processor environment 100 comprises a kernel portion that resides in kernel mode 112, and a user portion that resides in user mode 114. The kernel and user modes are standard ways of dividing the execution of threads in a computer system between operating system activities, such as activities performed by an operating system (OS) kernel, and application activities, such as those performed by a user's program.

For example, the UMS thread 102 may include a kernel portion 116 and a user portion 118. Likewise, the primary thread 106 may include a kernel portion 120 and a user portion 122. Additionally, the process thread 110 may include a kernel portion 124 and a user portion 126. In various embodiments, kernel mode 112 is implemented by the operating environment for a kernel of an operating system, i.e., the OS kernel. Kernel mode 112 is generally a privileged mode of operation with direct access to the hardware resources in the machine. Generally speaking, the OS kernel is responsible for managing a computing system's resources (i.e., hardware and software components). As a basic component of an operating system, the OS kernel provides the lowest-level abstraction layer for computing resources (e.g., memory, processors and I/O devices) that an application needs to control for the performance of various functions.

Moreover, the kernel and user portions of each thread in the exemplary multi-processor environment 100 may also include additional memory structure. For example, the kernel portion 116 may include a kernel mode stack 128, registers 130, and a kernel structure that describes the kernel portion 116, which is the kernel thread descriptor 132. Furthermore, the user portion 118 may include a user thread descriptor 134, which is a block of memory belonging to the user portion 118. The user portion 118 may further include registers 136, and a user mode stack 138.

It will be appreciated that the UMS thread 102 is distinguishable from a process thread, such as the standard thread 110. In various embodiments, a UMS thread may differ from a standard thread in that the scheduling assignments of CPUs to the UMS kernel portion and the UMS user portion may be independently managed by an operating system, while the kernel and user portions of a standard thread generally are assigned in unison. Thus, while switching between the kernel portion 124 and the user portion 126 of the standard thread 110 usually occurs implicitly during thread execution on a central processing unit (CPU), the UMS thread may provide applications with the ability to control the switch between the various user portions of its threads in user mode during execution. This capability allows applications to achieve higher performance and scalability because it is not always necessary to also switch the kernel portions of threads. For example, switching from a user portion to a kernel portion of a standard thread 110 generally requires an entry into kernel mode, saving the old kernel state, accessing some kernel global data structures and locks, restoring new states, and exiting kernel mode. However, because UMS threads provide applications with the ability to perform switches in user mode, the switches into kernel modes as well as kernel data and/or lock contentions may be avoided.

The UMS threads, such as the UMS threads 102-104, may be created from standard threads, such as the standard thread 110, by allowing the user portion 126 and the kernel portion 124 to be assigned to CPUs, such as CPU 144 and CPU 146, independently. In embodiments where the multi-processor environment 100 is running on IA-64 (Itanium) CPU architecture, for example, the creation of a UMS thread may involve the use of a special pointer 140 to the UMS states that are stored in user thread descriptor of the UMS thread. The special pointer 140 may be stored in a register that is accessible by other threads.

Alternatively, in embodiments where the multi-processor environment 100 is running on an x86 or x64 CPU architecture, the creation of a UMS thread may involve the use of a segment selector 142 that points to the user thread descriptor of the UMS thread. Accordingly, the special pointer and/or the selector of a UMS thread may enable other threads, such as the primary threads, to access the states of the UMS thread, as stored in its corresponding user thread descriptor.

The primary threads, such as primary thread 106 and the 108, may act as virtual processors for an application. In some embodiments, the number of primary threads present in the multi-processor environment 100 may correlate with the number of CPUs present in the environment. For example, the primary thread 106 may execute on the CPU 144, while the primary thread 108 may execute on the CPU 146. However, in other embodiments, the number of primary threads present may be greater or fewer than the number of CPUs in the multi-processor environment 100.

A primary thread may act as virtual processor for executing the user portions of a UMS thread. For example, but not as a limitation, an application running the user portion 122 of primary thread 106 on the CPU 144 can switch execution to the user portion 118 of the UMS thread. The application can subsequently switch to executing other user portions of the UMS threads by using its own scheduling policies without any intervention or support from the OS kernel to implement its own scheduling policies.

In various embodiments, a primary thread may be constructed from a standard thread, such as the standard thread 110, with the addition of an extra state. Thus, a primary thread may convert back and forth from a standard thread based on application requirements. For example, an application can respond to resource expansion by constructing more primary threads and a decrease in resource pressure scenarios can result in de-converting a primary thread back to a standard thread.

Figure 2A:
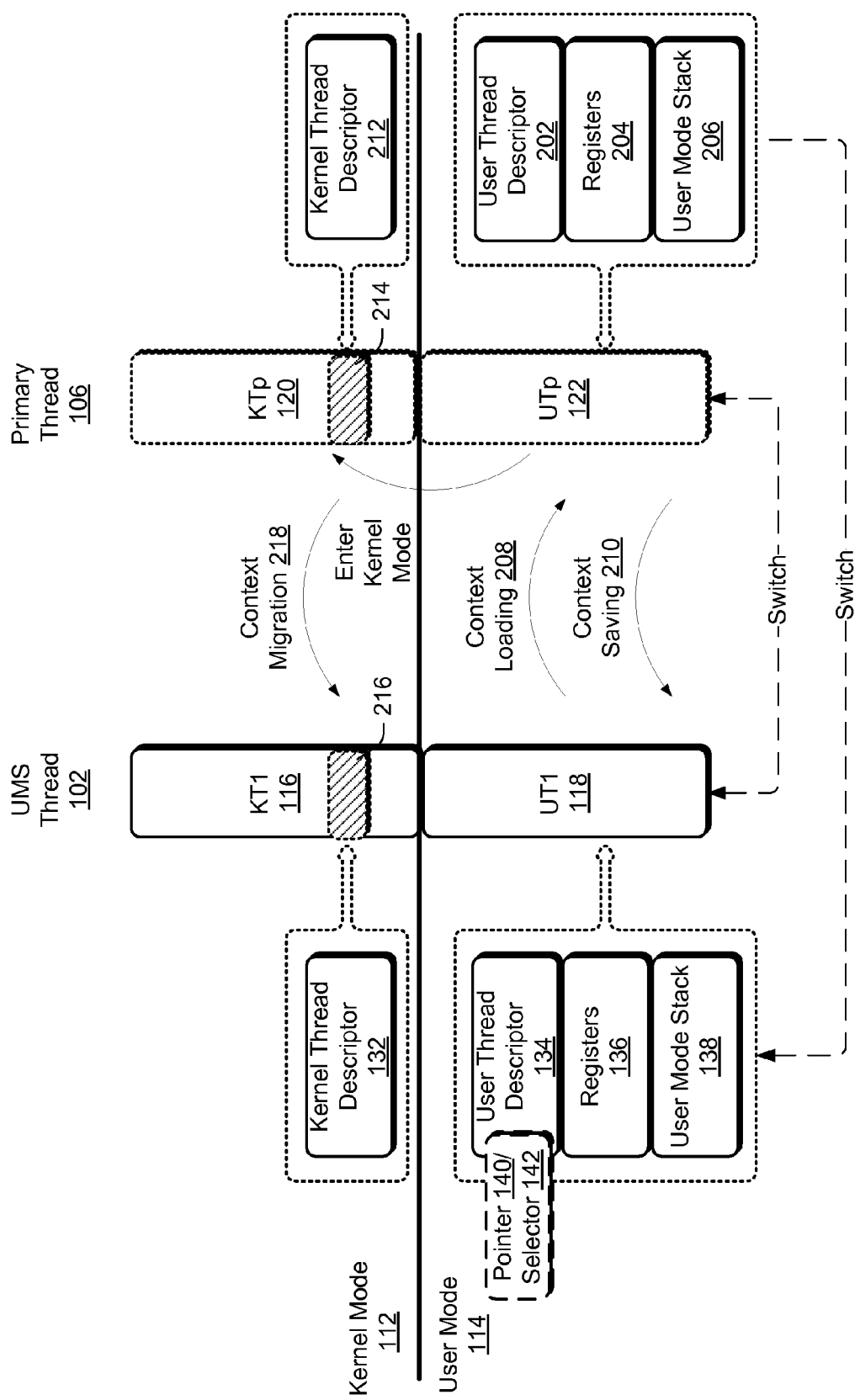
FIGS. 2a and 2b are block diagrams illustrating the execution of a user mode schedulable (UMS) thread in the user and kernel modes via the use of a primary thread, in accordance with various embodiments.
Figure 2B:
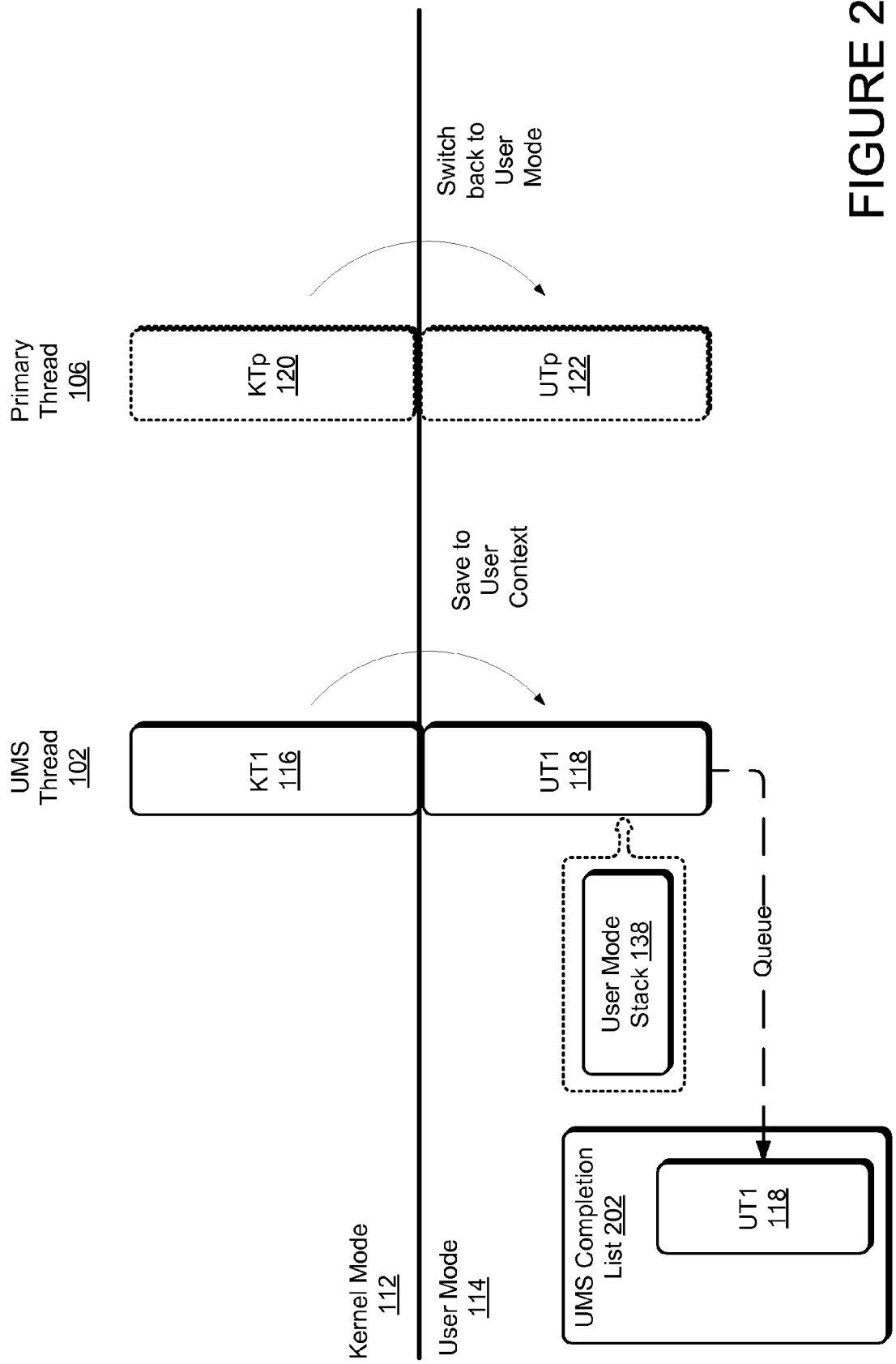

FIGS. 2a and 2b are block diagrams illustrating the execution of a user mode schedulable (UMS) thread in the user and kernel modes via the use of a primary thread, in accordance with various embodiments. It will be appreciated that while the FIGS. 2a and 2b are illustrated with respect to a single primary thread 106, the multi-processor environment 100 may include a plurality of primary threads running on multiple CPUs.

As shown in FIG. 2a, the exemplary UMS thread 102 may include a kernel portion 116 that resides in kernel mode 112, and a user portion 118 that resides in user mode 114. It will be appreciated that the execution of a UMS thread, such as the UMS thread 116, differs from the execution of a standard thread, such as the standard thread 110 (FIG. 1). Standard thread processing is generally dependent on the automatic, that is, implicit switch between a kernel portion of a thread and a user portion of a thread. For example, during the execution of the standard thread 110 (FIG. 1), a CPU may process the kernel portion 124 of the standard thread 106 in kernel mode 112. Subsequently, the CPU may change from kernel mode 112 to user mode 114 by automatically switching from the kernel portion 124 of the standard thread 110 to the user portion 126. The user portion 126 of the standard thread 110 is then further processed in user mode. Additionally, when the execution is to be switched to the user portion of another standard thread, the current user portion 126 needs to switch to its kernel portion 124, which then switches to the kernel portion of the next standard thread to run. The kernel portion of the next standard thread may also further switch to its user portion in the same manner.

However, during the processing of a UMS thread, the switch to the kernel portion of the UMS thread is generally not required to switch to the user portion of another thread. The prevention of automatic switching from a user portion to a kernel portion of a UMS thread during processing is a fundamental principle of the UMS computing architecture. This architecture may enable computer applications to have greater control over the concurrency and efficiency of threads in both single-processor and multi-processor environments.

Instead, the UMS threads may use alternative implementations to perform tasks in user mode 114. A particular alternative implementation is illustrated in FIG. 2a with respect to the UMS thread 102. As shown, a CPU may in essence execute the user portion 118 of the UMS thread 102 with the assistance of the primary thread 106. For example, the user portion 122 of the primary thread 106 may "switch" to the user portion 118 of the UMS thread 102. The CPU may then execute the user portion 118 of the UMS thread 102 in lieu of the user portion 122 of the primary thread 106.

In various embodiments, the "switch" of the user portion 122 to the user portion 118 may be accomplished by saving the context state of the user portion 118 and loading the context state of the user portion 122. In at least one such embodiment, the saving and loading of context states of the user portion 118 to the user portion 122 includes switching the user thread descriptor 134 of the UMS thread 102 with a user thread descriptor 202 of the primary thread 106 using one of the pointer 140 or the segment selector 142 (FIG. 2a). Moreover, the transfer may also include the switch of the context states from the registers 136, including the register pointing to the user mode stack 138 of the UMS thread 102, to the corresponding registers 204 and user mode stack 206 of the primary thread 106. The switching of the user thread descriptors and the various register and stack states is shown in FIG. 2a as "context loading" 208 and "context saving" 210. Subsequently, the user portion 122 of the primary thread 106 may be executed using the same CPU.

Following the execution of the user portion 122, the user thread descriptors, registers, and user mode stacks of the user portion 122 and the user portion 118, respectively, may be switched to enable execution of the user portion 118, or the user portion of yet another thread. These switches may be repeated one or more times. In other embodiments, the switching between the user portions of UMS threads may not need to use the user portion of the primary thread as an intermediary.

At some point in the execution of the user portion 118 of UMS thread 102 in user mode 114 (via the use of the user portion 122), the UMS thread 102 may need to enter kernel mode 112 from user mode 114. In other words, the user portion 118 of the UMS thread 102 may need to switch to the kernel portion 116. In various instances, the need to enter kernel mode 112 may arise due to the occurrence of a system call (synchronous entry into kernel mode), an exception (asynchronous entry into kernel mode), or an interrupt (asynchronous entry into kernel mode). As used herein, synchronous refers to a situation where entry into kernel mode is synchronized with the execution design of the user portion and thus only a certain portion of the information in the register state 126 (FIG. 1) of a UMS thread needs to be saved and later re-loaded, while asynchronous refers to a situation where the execution of the user portion is interrupted essentially at a random point and thus all the information in the register state 126 needs to be saved and later re-loaded. It will be appreciated that while system calls and exceptions are thread-specific, interrupts are not specific to any thread.

For standard thread, such as standard thread 110 (FIG. 1), the switch from a user portion to a kernel portion may be accomplished implicitly when the standard thread may enters kernel mode 112 from user mode 114. To provide isolation between application and operating system execution, user mode 112 and kernel mode 114 provide special register state to reduce how much saving and loading is required when switching from the user portion 126 of a standard thread 110 to the kernel portion 124, such as providing a separate register pointing to the kernel mode stack 128. These special facilities in the CPU architecture make some of the state save restore when switching between the user and kernel portions of the same standard thread "implicit". For example, upon entry of the standard thread 110 into kernel mode 112, register state may be automatically spilled to the implicit stack pointer and the new kernel stack pointer may be automatically loaded. Moreover, during the switch of the kernel portion 124 with the kernel portion of another standard thread (not shown), this special register state may be loaded (in addition to a regular stack pointer) to point to the kernel stack area of the new standard thread.

However, the switch from the user portion 118 of UMS thread 102 to the kernel portion 116 may need special steps that are not necessary for the implicit switch from the user portion 126 to the kernel portion 124 of a standard thread 110 (FIG. 1). As shown in FIG. 2a, the initial step of the switch from the user portion 118 to the kernel portion 116 of the UMS thread 102 is an implicit switch between the user portion 122 and the kernel portion 120 of the primary thread 106. This is due to the fact that the user portion 118 was previously executing as the user portion 122 in user mode 114. Nevertheless, this "implicit switch" does not produce the desired result because the user portion 122 of the primary thread 106 has been replaced by the user portion 118 of the UMS thread 102. In other words, as far as the OS kernel last knew the state of what was running in user mode on the processor, it was the user portion 122 of the primary thread 106. This is because a switch from user portion 122 to the user portion 118 in the UMS thread 102 can occur without the awareness of the OS kernel. Thus, when the user portion 122 enters kernel mode 112, the implicit switch will take it to the kernel portion 120 of the primary thread 106. However, since the user portion 122 was really replaced by the user portion 118 of the UMS thread 102, the user portion 118 will actually enter kernel mode 112.

Accordingly, when the user portion 118 of UMS thread 102, not the user portion 122 of the primary thread 106, enters kernel mode 112, the OS kernel that is expecting the user portion 122 of primary thread 106 may have the ability to detect the mismatch based on the identities of each user portion. In various embodiments, the identity of each user portion of each thread, which is part of the context information of each thread, may be stored in the kernel thread descriptors. For example, the identity of the UMS thread 102 may be stored in its kernel thread descriptor 132, while the identity of the primary thread 106 may be stored in its kernel thread descriptor 212.

For correct operation of the system, the OS kernel needs to handle this case where the "implicit switch" will run the kernel portion of the wrong thread. This is because the operating system attaches certain import information (such as the security context) to the kernel thread descriptor. Since this state is only ever consumed in kernel mode 112, the UMS thread needs to run with the correct context once it enters kernel mode 112. Therefore, in the example of the UMS thread 102, the OS kernel may switch from the kernel portion 120 of the primary thread 106 to the kernel portion 116 once the UMS thread 102 enters kernel mode 112. This cross-thread switching process is referred to as a "directed switch." Thus, directed switches may enable UMS threads to be executed transparently in an operating system, that is, in the same way as standard threads.

In various embodiments, the directed switch may be accomplished by exchanging context information 214 of the kernel portion 120 (primary thread 106) with the context information 216 of the kernel portion 116 (UMS thread 102). This process is shown as "context migration" 218. As used throughout, "context information" refers to the state of a thread, which may include the registers that the thread may be using, as well as other operating system and hardware specific data necessary for the execution of the thread. In this way, once the context migration 218 is completed, the kernel portion 116 may be executed by a CPU in kernel mode 112.

FIG. 2b illustrates the switch of the UMS thread 102 back to user mode 114 following the execution of the kernel portion 116 of the thread in kernel mode 112. As shown, the UMS thread 102 may switch back to user mode 114 by saving the context information of its user portion 118 that was saved by the OS kernel into some user mode accessible structure when the user portion previously entered kernel mode 112. For example, in some embodiments, the context information may be saved to the user mode stack 138 of the user portion 118. In other embodiments, the context information may be saved to the user thread descriptor 134.

Subsequently, the kernel portion 116 of the UMS thread 102 may cause the context information associated with user portion 118 of the UMS thread 102 to be queued to a UMS completion list 202. The UMS completion list 202 may be a UMS data structure on which the OS kernel queues context information for user portions of the UMS threads that are ready for execution in user mode 112. After the queuing of the user portion 118, the kernel portion 116 of the UMS thread 102 may place itself in a "parked" state (i.e., a type of ready waiting state).

Moreover, when freed by the UMS thread 102 following the kernel mode context migration 218, the primary thread 106 may switch back to its user portion 122 in user mode 114. Once back in user mode 114, the user portion 122 primary 106 may switch to the user portion of another UMS thread for execution.

Figure 3:
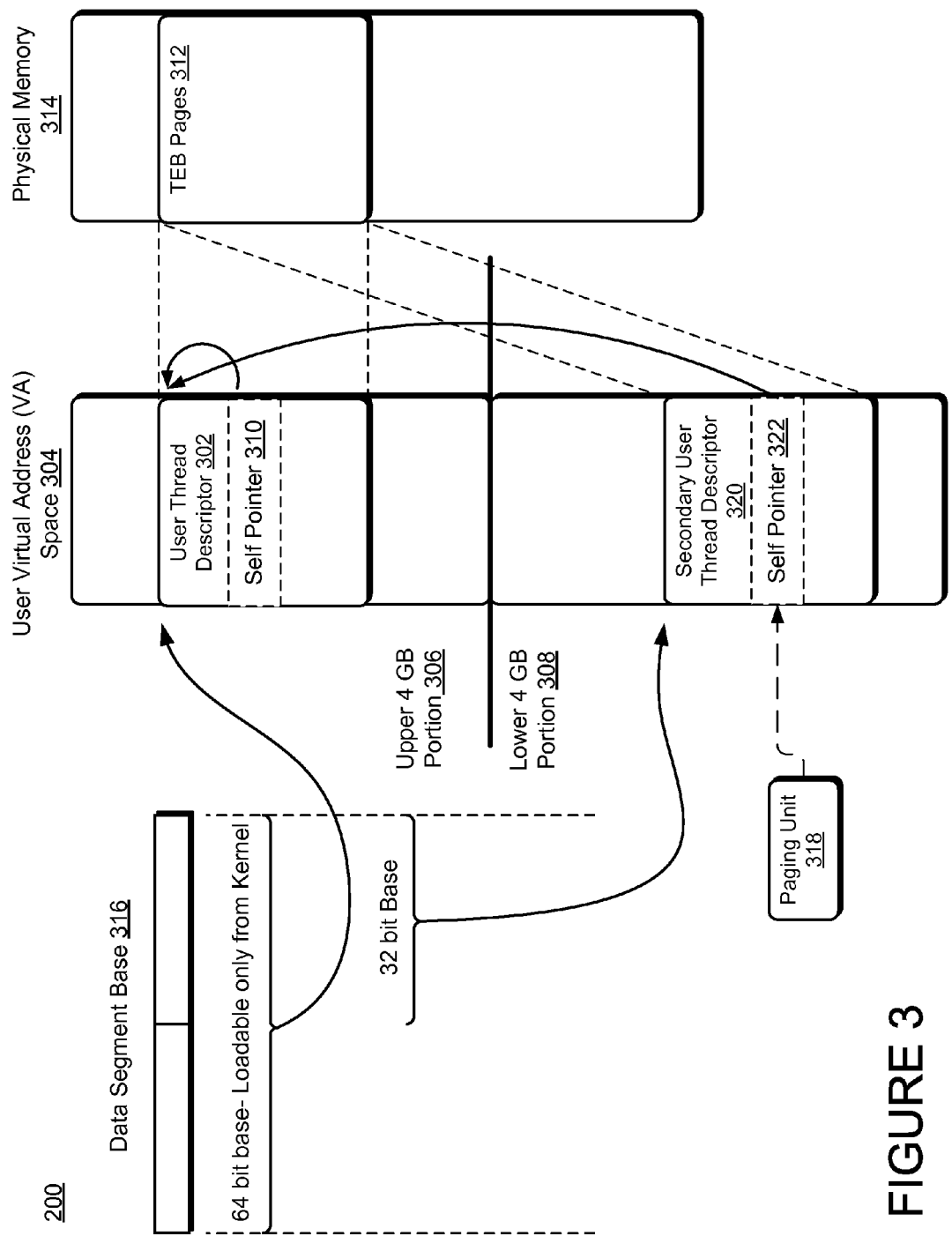
FIG. 3 illustrates the dual mapping of the user thread descriptor of a primary thread for the purpose of facilitating the execution of a primary thread, such as the primary thread 106, in accordance with various embodiments.

FIG. 3 illustrates the dual mapping of the user thread descriptor of a primary thread for the purpose of facilitating the execution of a primary thread, such as the primary thread 106, in accordance with various embodiments. The dual mapping is needed to accommodate the AMD 64/Intel EM64T architecture. As described above with respect to FIG. 2, the execution of the UMS thread 102 in user mode 114 via the primary thread 106 relies on the ability to switch user thread descriptors of the primary thread and the UMS thread.

In various embodiments, a primary thread may be created from a standard thread 110 (FIG. 1), which may include NT threads. Moreover, the user thread descriptor of each primary thread is dynamically allocated by the OS kernel during the creation of the original standard thread 100. Thus, the user thread descriptor of a primary thread may reside in any part of a User Virtual Address (VA) space. As shown in FIG. 3, the User VA space 304 may include addresses above 4 GB (2^32), such as an upper 4 gigabyte (GB) portion 306 shown as well as a lower 4 GB portion 308.

Thus, in one example, the user thread descriptor 302 of a primary thread may reside in an upper 4 gigabyte (GB) portion 304 of the User VA space 306. Further, the user thread descriptor 302 may include a self-pointer 310 that points to the beginning of the user thread descriptor 302. For example, but not as a limitation, if the user thread descriptor 302 begins at hexadecimal memory address "B00000100", the self pointer 310 may point to the memory address "B00000100". Moreover, the user thread descriptor 302, as located in the User VA space 304, may map to the user thread descriptor pages 312 located in the physical memory 314. The self pointer 310 may be used by various processes to access or refer to the user thread descriptor via its flat linear address.

In various computing architectures, the user thread descriptor 302 may be accessed, such as for the purpose of UMS thread switching, via different structures. For example, but not as a limitation, Intel Architecture, 32 bit (IA-32) and AMD64/Intel EM64T architectures may access the user thread descriptor 302 via a data segment 316. The Intel Architecture, 64 bit (IA-64), on the other hand, may access the user thread descriptor 302 via a general purpose register (not shown).

While the IA-32 and the IA-64 architectures need no special accommodations to access the user thread descriptor 302 that is stored in the User VA, the AMD 64/Intel EM64T architectures may pose special constraints. Specifically, due to historical limitations, the loading of the data segment 316 from user mode, is constrained to 32 bits (rather than the 64 bits that are loadable from kernel mode. The 32 bits of the data segment 310 corresponds to the lower 4 GB 308 of the User VA space 306. As a result, when a primary thread includes the user thread descriptor 302 that is located in the upper 4 GB 304, the user thread descriptor 302 is inaccessible by the data segment 310.

Accordingly, in such a scenario, a page unit 318 may be used to generate an image of the user thread descriptor 302 in the lower 4 GB portion 308. In other words, a second mapping to the user thread descriptor pages 312, referred to in FIG. 3 as secondary user thread descriptor 320, may be created in the lower 4 GB portion 308. Moreover, it will be appreciated that while a self pointer 322, which is a mirror image of the self pointer 310, may reside in the secondary user thread descriptor 320. It nevertheless points to the beginning of the user thread descriptor 302. For example, but not as a limitation, even if the secondary user thread descriptor 320 begins at memory address "20" in the example, the self pointer 320 still points to the memory address "B00000100". As a result, regardless of whether the data segment 316 is loaded from kernel mode 112 or user mode 114, user thread descriptor access operations will always lead to the same actual user thread descriptor pages 312 in the physical memory 314.

In various embodiments, the secondary user thread descriptor 320 may be removed from the User VA space 304 when it has been established that the address of the secondary user thread descriptor 320 is not being used, and no further switches of the primary thread that corresponds to the secondary user thread descriptor 320 will occur.

Figure 4:
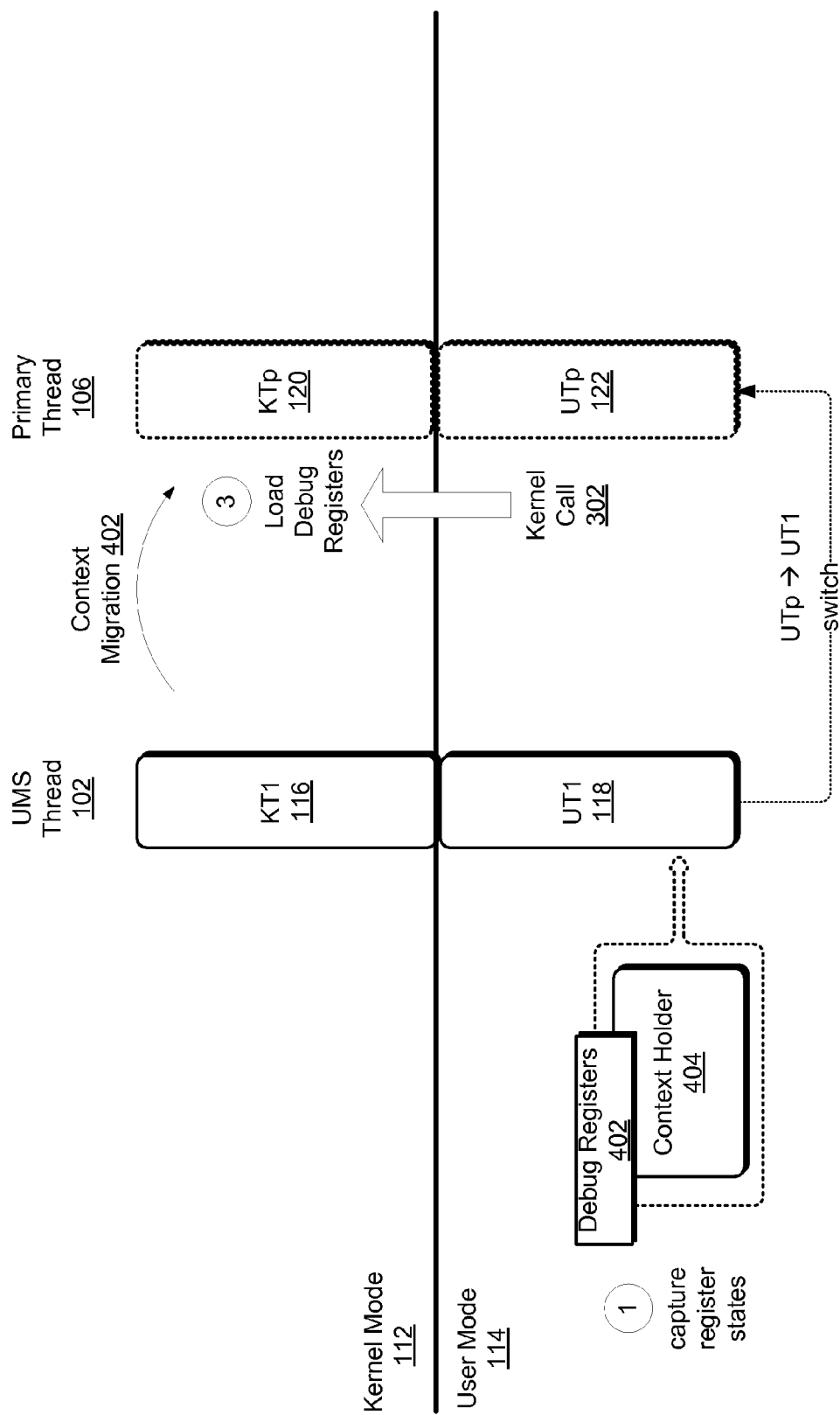
FIG. 4 illustrates the handling of privileged hardware states during the switch of a primary thread and a UMS thread in user mode, in accordance with various embodiments.

FIG. 4 illustrates the handling of privileged hardware states during the switch of a primary thread and a UMS thread in user mode, in accordance with various embodiments. It will be appreciated that while the handling of the privileged hardware states is illustrated using the UMS thread 102 and the primary thread 106, the same principles hold for other UMS thread and primary threads.

As described above, during the switching of the user portion 122 of the primary thread 106 with the user portion 118 of the UMS thread 102, the user thread descriptor and registers of each thread may be switched, that is, swapped. Nevertheless, the switch of certain privilege hardware states that are not stored in the user thread descriptor and the registers of the UMS thread 102 is generally not allowed in user mode 114. For example, the loading of the hardware debug registers 402 of the UMS thread 102, which may include privileged hardware states, into the primary thread 106, is not permitted in user mode 114.

As shown in FIG. 4, when debug registers 402 are enabled for the UMS thread 102, the updated register states of the UMS thread 102 are captured and stored in a context holder 404 of the user portion 118. Thus, when the primary thread 106 switches to the UMS thread 102 in user mode 112, the primary thread 106 may detect that the debug values are stored in the context holder 404 of the user portion 118. In various embodiments, the context holders 404 may include the user mode stacks 138 as described in FIG. 2a.

Subsequently, the primary thread 106 may invoke a kernel call 406 to enter kernel mode 112. Once in kernel mode 112, the primary thread 106 may change its own thread state to reflect the kernel states of the UMS thread 102. In various embodiments, the primary thread 106 may accomplish the thread state change by exchanging its context information with the context information of the UMS thread 102 via a context migration 402. Following the thread state change, the primary thread 106 may load the hardware debug registers 402 into its kernel portion 120.

Figure 5A:
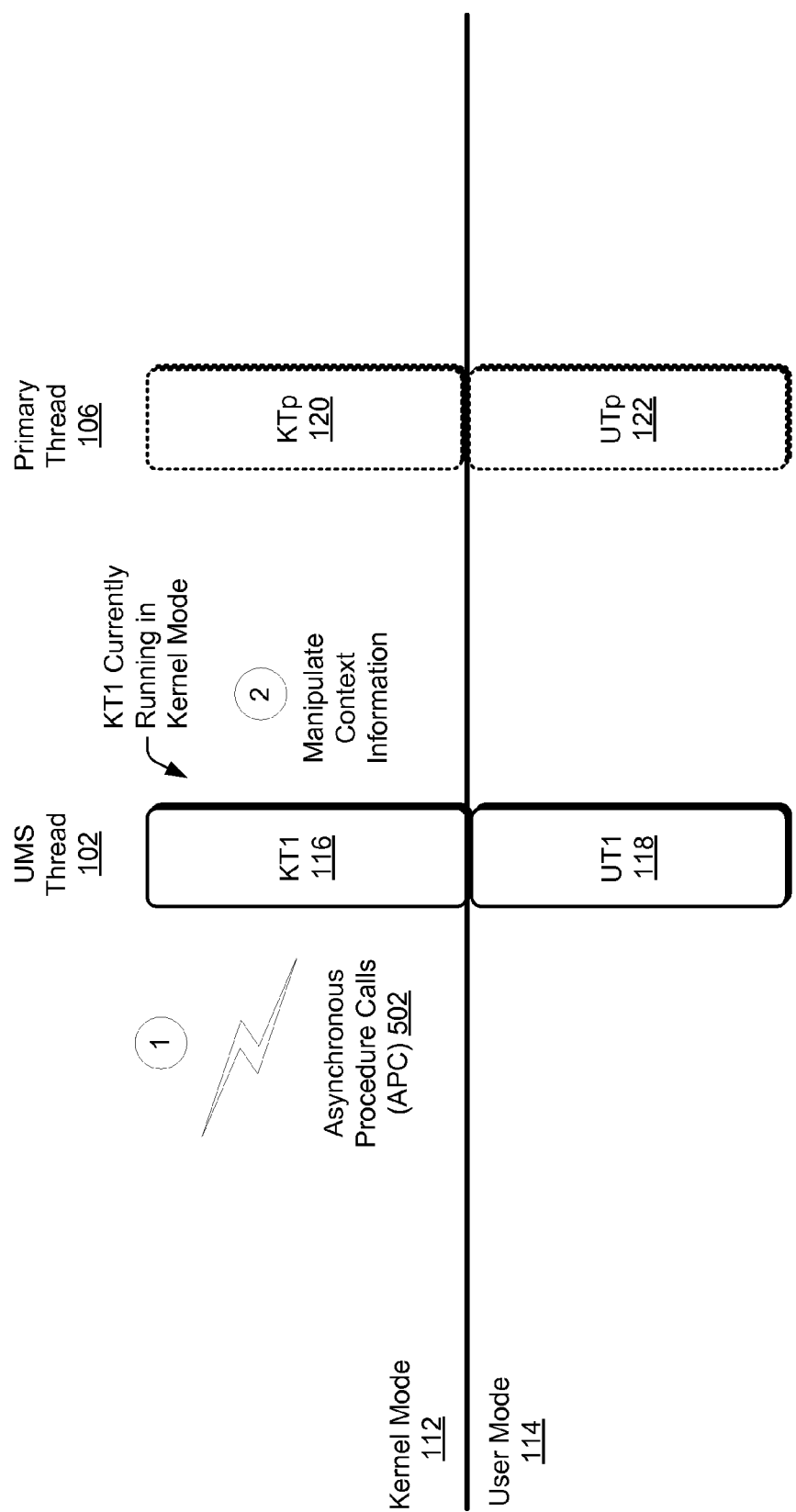

FIG. 5a illustrates the occurrence of an asynchronous procedure call (APC) event 502 (a type of signal event) during the execution of the kernel portion of a UMS thread in kernel mode, in accordance with various embodiments. The execution of the kernel portion of the UMS thread may be a part of the overall execution of the UMS thread in both the kernel and user mode, as previously described in FIGS. 2a and 2b.

An APC can perform various actions, including collecting and/or changing the context of thread. Moreover, since APCs are asynchronous, they may occur at any time during the execution of UMS thread via a primary thread. In various embodiments, the APCs are generally delivered to the kernel portions of threads in kernel mode 112. However, the APCs may impact the execution of threads in user mode 114. For example, but not as limitation, the APCs may be used to obtain the context of the user portions of threads, to suspend the execution of the user portions of threads, and to terminate the execution of the user portion of threads. It will be appreciated that while the occurrence of the APC 502 is illustrated using the UMS thread 102 and the primary thread 106, the same principles hold for other UMS threads and primary threads.

As shown in FIG. 5a, an APC 502 may be fired into kernel mode 112 when the kernel portion 116 of the UMS thread 102 is being executed in kernel mode 112. Accordingly, the APC 502 may run on the kernel portion 116. For example, the APC 502 may retrieve the context information from the kernel portion 116. In another example, the APC 502 may modify the context information in the kernel portion 116.

Figure 5B:
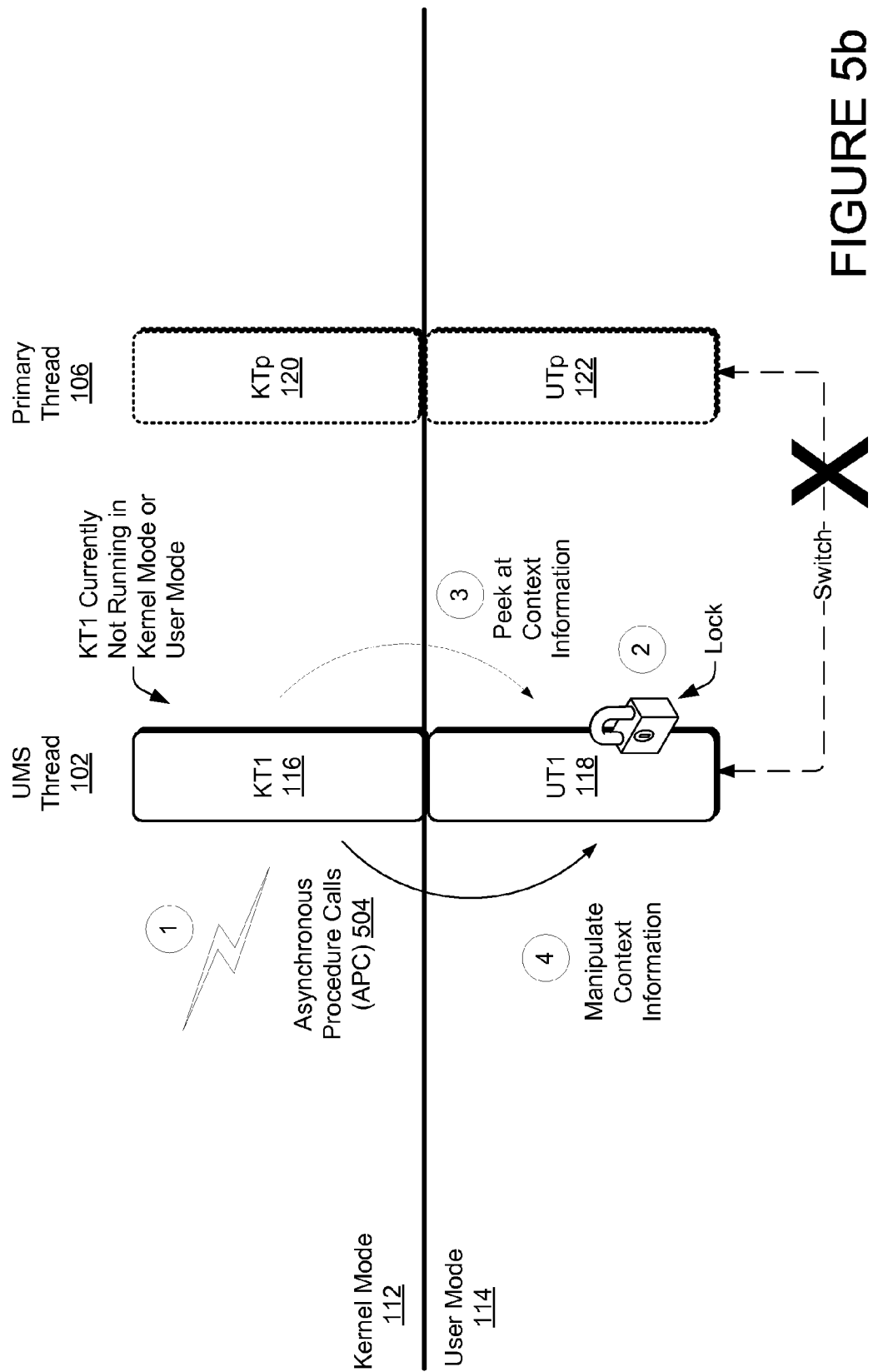

FIG. 5b illustrates the occurrence of an asynchronous procedure call (APC) event 504 when the kernel portion and user portions of a UMS thread are not being executed, in accordance with various embodiments. It will be appreciated that while the occurrence of an APC is illustrated using the UMS thread 102 and the primary thread 106, the same principles hold for other UMS threads and primary threads.

As shown, the kernel portion 116 of the UMS thread 102 is not being executed in kernel mode 112 when the APC 504 is delivered to the UMS thread 102 in kernel mode. Upon receiving the APC 504, the kernel portion 116 may first cause a "kernel lock" to be placed on the user portion 118. In various embodiments, the "kernel lock" may be the performed using the lock bit 606 further described below in FIG. 6. The "kernel lock" may prevent the states of the user portion 118 from being modified by another mechanism, such as by a user mode scheduler. In various embodiments, the "kernel lock" may refer to a soft lock that does not prevent the user states of the user portion 118 from being accessed by a non-cooperative code.

Second, the kernel portion 116 of the UMS thread 102 may peek at the user portion 118 of the thread to determine whether the user portion 118 is currently being executed. In at least one embodiment, the UMS thread 102 may look at a specific context field of the user portion 118 to determine whether it is already being executed. If the kernel portion 116 determines that the user portion 118 is idle and not being executed, the kernel portion 116 may enable the APC 504 to access the user portion 118. For example, the APC 504 may retrieve the context information from the user portion 118. In another example, the APC 502 may modify the context information in the user portion 118.

FIG. 5c illustrates the occurrence of an asynchronous procedure call (APC) event 506 when the user portion of a UMS thread is being executed in user mode via a primary thread, in accordance with various embodiments. It will be appreciated that while the occurrence of the APC 506 is illustrated using the UMS thread 102 and the primary thread 106, the same principles hold for other UMS threads and primary threads.

As shown, the kernel portion 116 of the UMS thread 102 is not being executed in kernel mode 112 when the APC 506 is delivered to the UMS thread 102 in kernel mode 112. Upon receiving the APC 506, the kernel portion 116 may first cause a "kernel lock" to be placed on the user portion 118. In various embodiments, the "kernel lock" may be the performed using the lock bit 606 further described below in FIG. 6.

Second, the kernel portion 116 of the UMS thread 102 may peek at the user portion 118 of the thread to determine whether the user portion 118 is currently being executed. In at least one embodiment, the UMS thread 102 may look at a specific context field of the user portion 118 to determine whether it has been locked for execution, such as execution by a primary thread. As further described below, when the user portion 118 is locked for execution by a primary thread, the corresponding "lock" may include a client identifier (CID) 508 that identifies the particular primary thread. For example, the CID 508 may identify the particular primary thread as the primary thread 106.

Thus, once the kernel portion 116 determines that the user portion 118 is currently locked for execution by the primary thread 106 (e.g., switched with the user portion 122), the kernel portion 116 may fire a disassociate APC 510 to the primary thread 106, as identified by the CID 508.

In various embodiments, assuming that the user portion 122 of the primary thread 106 is being executed in user mode 114, the disassociate APC 510 may cause the primary thread 106 to abandon its execution in user mode 114 and return to kernel mode 112. Moreover, once the primary thread 106 is in kernel mode 114, the primary thread 106 may return the context information from its kernel portion 120 to the user portion 118 of the UMS thread 102. Having returned the context information, the primary thread 106 may return to user mode 114. In other words, the primary thread 106 may switch to its user portion 122, which may eventually pick up another UMS thread user portion for execution. Further, the kernel portion 116 may enable the APC 506 to access the user portion 118. For example, the APC 506 may retrieve the context information from the user portion 118. In another example, the APC 506 may modify the context information in the user portion 118.

Figure 5D:
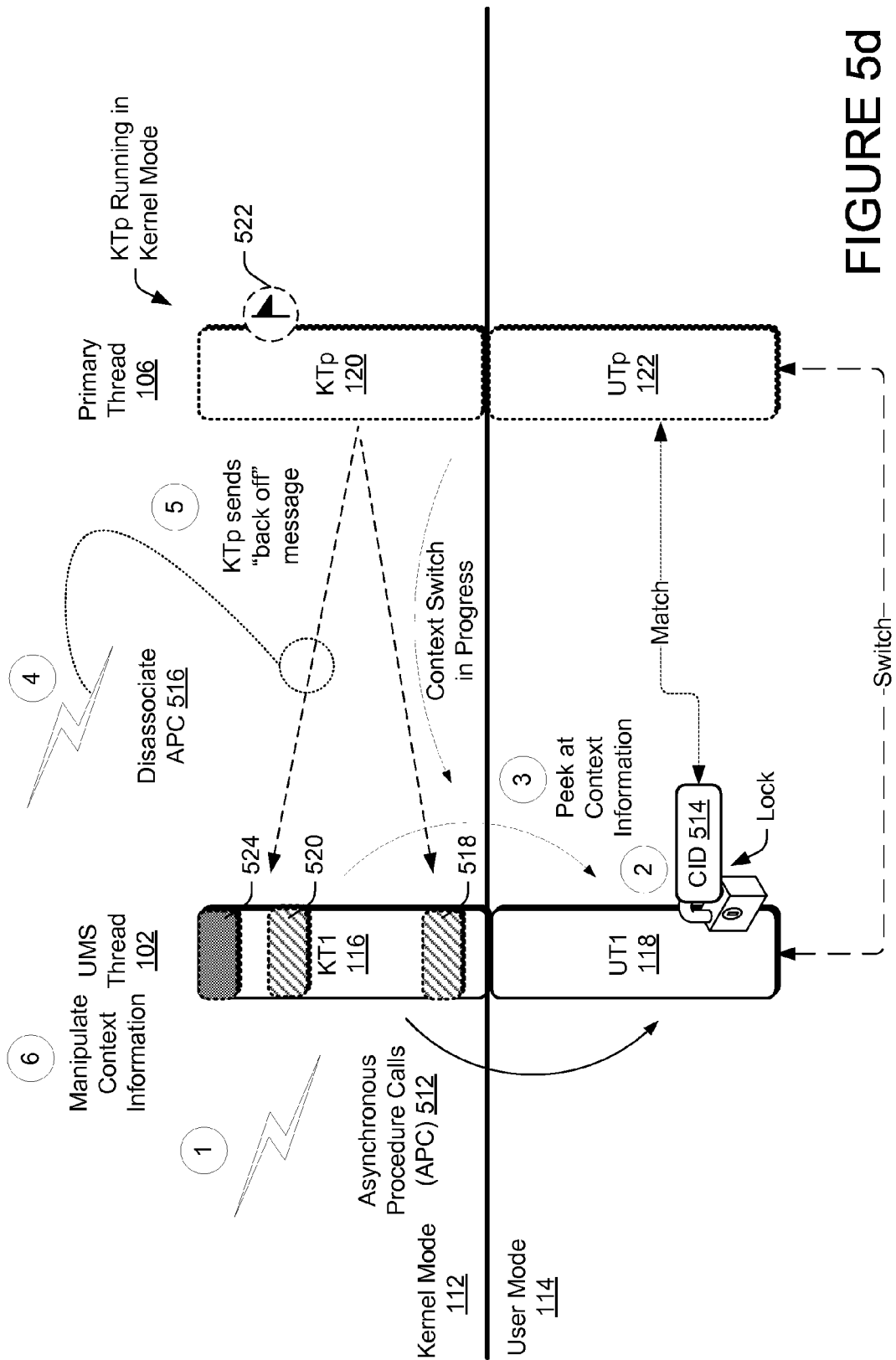

FIG. 5d illustrates the occurrence of an asynchronous procedure call (APC) event 512 when a context migration from a primary thread to a UMS thread, or a directed switch, is being performed in kernel mode, in accordance with various embodiments. It will be appreciated that while the occurrence of the APC 512 is illustrated using the UMS thread 102 and the primary thread 106, the same principles hold for other UMS threads and primary threads.

As shown, the kernel portion 116 of the UMS thread 102 is not being executed in kernel mode 112 when the APC 512 is delivered to the UMS thread 102 in kernel mode. Upon receiving the APC 512, the kernel portion 116 may first cause a "kernel lock" to be placed on the user portion 118. In various embodiments, the "kernel lock" may be the performed using the lock bit 606 further described below in FIG. 6. Second, the kernel portion 116 of the UMS thread 102 may peek at the user portion 118 of the thread to determine whether the user portion 118 is currently being executed. In at least one embodiment, the UMS thread 102 may look at a specific context field of the user portion 118 to determine whether it has been locked for execution, such as execution by a primary thread. As further described below, when the user portion 118 is locked for execution by a primary thread, the corresponding "lock" may include a client identifier (CID) 514 that identifies the particular primary thread. For example, the CID 514 may identify the particular primary thread as the primary thread 106.

Thus, once the kernel portion 116 determines that the user portion 118 is currently locked for execution by the primary thread 106 (e.g., switched with the user portion 122), the kernel portion 116 may fire a disassociate APC 516 to the primary thread 106, as identified by the CID 514.

In various embodiments, assuming that the kernel portion 120 of the primary thread 106 is running in kernel mode 112, the kernel portion 120 may be in the process of "context migration 218" (FIG. 2a) when the disassociate APC 516 is fired. As described above, "context migration" 218 may include the transfer of context information 214 from the kernel portion 120 to the kernel portion 116 of the UMS thread 102. In various instances, this may create a blocking condition as the kernel portion 116 may be waiting for the disassociate APC 516 to be implemented by the kernel portion 120. In turn, the kernel portion 120 may be unable to disassociate as it is already in the process of transferring state (i.e., the most recent/accurate UMS thread state is actually in the kernel portion 116, not in the user thread descriptor 202 of user portion 122).

In order to alleviate this blocking condition, the primary thread 106 may send a "defer" message to the kernel portion 116 of the UMS thread 102 in response to the disassociate APC 516. The "defer" message may inform the UMS thread 102 that the primary thread 106 is attempting to switch to the UMS thread 102. In response to the "defer" message, a routine 518 that is created for and enables the APC 512 to pull the context information into kernel portion 116 may be temporarily rendered inactive. In the place of routine 518, the disassociate APC 516 may create a function 520 in the kernel portion 116 that waits for an indicator 522 from the primary thread 106. The indicator 522 may be configured to show that the context information has become ready to transfer from the kernel portion to the kernel portion 116. Thus, when the kernel portion 120 signals the UMS thread 102 with the indicator 522, the original APC 512 may "pull" the context information from the user portion 118 into a staging area 524 that is in the kernel portion 116. This staging area enables the primary thread 106 to be informed that its part in the "directed switch" operation is completed, even before running the actual APC 512. Once the original APC 512 completes the pull, the routine 518 may pull the context information from the staging area 524 and replace the original context information of the kernel portion 116, such as context information 216 (FIG. 2a), with the context information from kernel portion 120. It will be appreciated that the staging area 524 is necessary as the APC 516 may result in a suspension of the UMS thread 102. Thus, the primary thread 106 should be released prior to this suspension, thereby necessitating the staging area 524 as a safe temporary storage area for the context information in the event of a suspension Further, since the appropriate context information is in the kernel portion 116, the kernel portion 116 may enable the APC 512 to run on the kernel portion 116. For example, the APC 512 may retrieve the context information from the kernel portion 116. In another example, the APC 512 may modify the context information in the kernel portion 116.

Figure 5E:
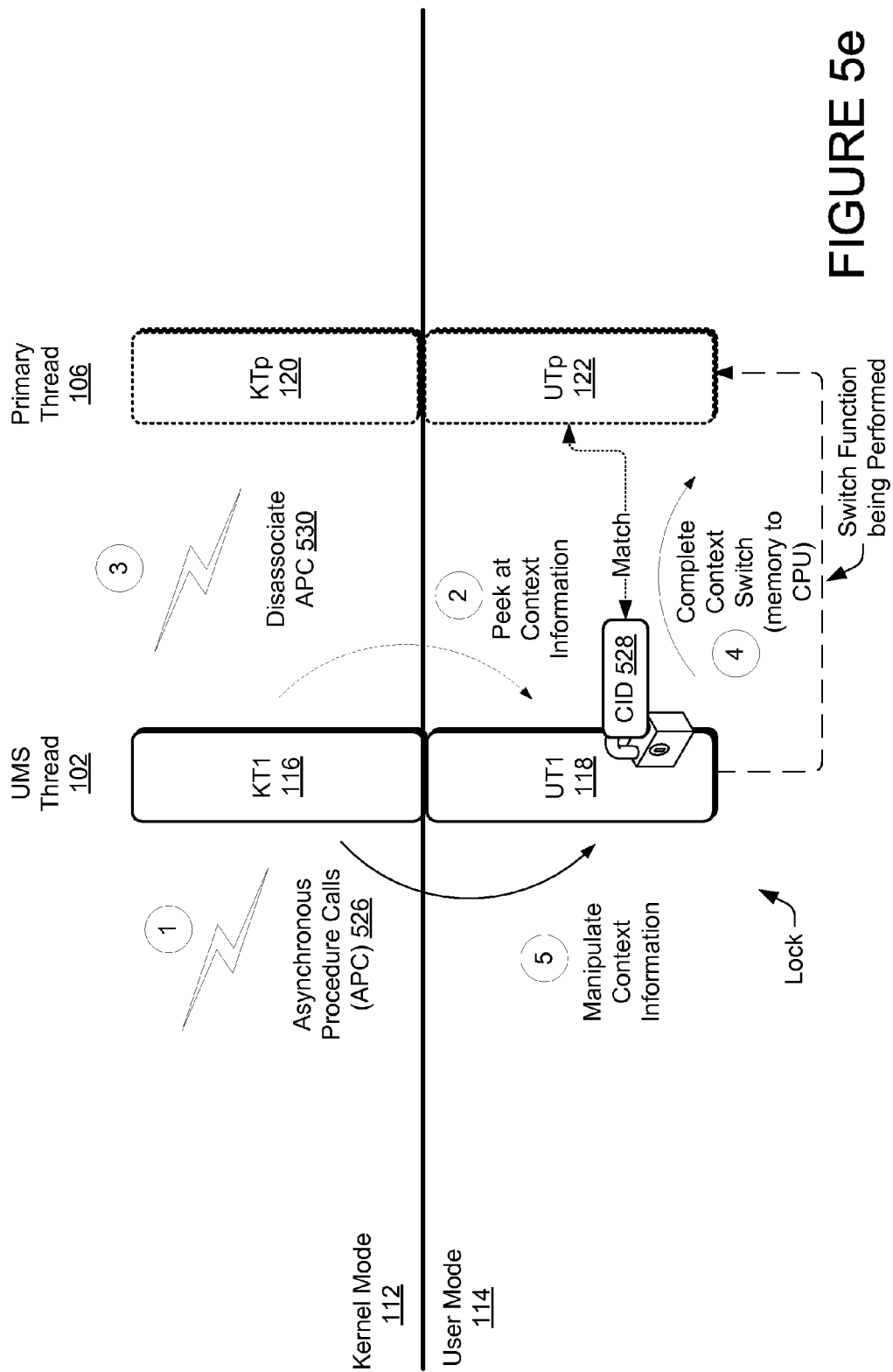

FIG. 5e illustrates the occurrence of an asynchronous procedure call (APC) event 526 when a context loading from the UMS thread to a primary thread is being performed in user mode, in accordance with various embodiments. It will be appreciated that while the occurrence of the APC 526 is illustrated using the UMS thread 102 and the primary thread 106, the same principles hold for other UMS threads and primary threads.

As shown, the kernel portion 116 of the UMS thread 102 is not being executed in kernel mode 112 when the APC 526 is delivered to the UMS thread 102 in kernel mode. Upon receiving the APC 526, the kernel portion 116 may first cause a "kernel lock" to be placed on the user portion 118. In various embodiments, the "kernel lock" may be the performed using the lock bit 606 further described below in FIG. 6. Second, the kernel portion 116 of the UMS thread 102 may peek at the user portion 118 of the thread to determine whether the user portion 118 is currently being executed. In at least one embodiment, the UMS thread 102 may look at a specific context field of the user portion 118 to determine whether it has been locked for execution, such as execution by a primary thread. As further described below, when the user portion 118 is locked for execution by a primary thread, the corresponding "lock" may include a client identifier (CID) 528 that identifies the particular primary thread. For example, the CID 528 may identify the particular primary thread as the primary thread 106. Thus, once the kernel portion 116 determines that the user portion 118 is currently locked for execution by the primary thread 106 (e.g., switched with the user portion 122), the kernel portion 116 may fire a disassociate APC 530 to the primary thread 106, as identified by the CID 528.

As further shown, a switch between the primary thread 106 (user portion 122) and the UMS thread 102 (user portion 118) may be in the middle of being performed when the disassociate APC 530 is fired. Accordingly, the primary thread 106 may be in the process of collecting context information from the user portion 118. For example, this collection is depicted in FIG. 2a as context loading 208. Thus, during the occurrence of the disassociated APC 530, it is possibly that a portion of the context information belonging to the UMS thread 102 is still in the memory (e.g., registers 136) associated with the user portion 118, while the remainder of this context information has been transferred to the processor executing the user portion 122, such as CPU 144. This progression of context loading 208 may be detected by the OS kernel as the disassociate APC 530 is delivered to the UMS thread 102 in kernel mode 112.

In response to the detection that a switching function was in progress when APC 530 or a page fault (a type of asynchronous event) occurs, the OS kernel may complete the context loading on behalf of the user portion 122. In at least one embodiment, the OS kernel may finish the collection of context information regarding the user portion 118 into the memory associated with the primary thread 106. Once the context loading is complete, the kernel portion 116 may enable the APC 526 to access the user portion 118. For example, the APC 526 may retrieve the context information from the user portion 118. In another example, the APC 526 may modify the context information in the user portion 118.

Figure 5F:
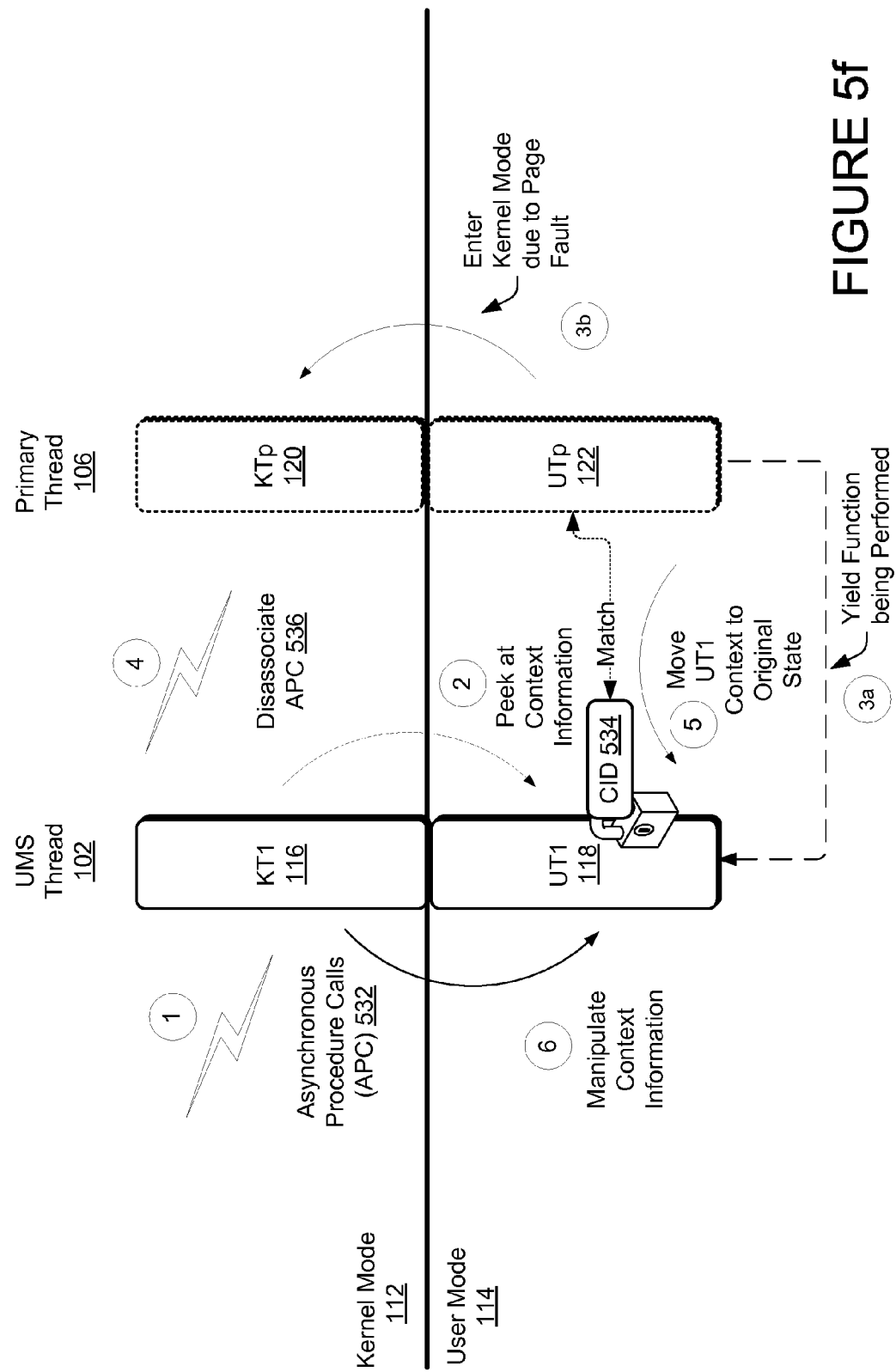

FIG. 5f illustrates the occurrence of an asynchronous procedure call (APC) event 532 when a context saving from the primary thread to the UMS thread is being performed in user mode in accordance with various embodiments. It will be appreciated that while the occurrence of the APC 532 is illustrated using the UMS thread 102 and the primary thread 106, the same principles hold for other UMS threads and primary threads.

As shown, the kernel portion 116 of the UMS thread 102 is not being executed in kernel mode 112 when the APC 532 is delivered to the UMS thread 102 in kernel mode. Upon receiving the APC 532, the kernel portion 116 may first cause a "kernel lock" to be placed on the user portion 118. In various embodiments, the "kernel lock" may be the performed using the lock bit 606 further described below in FIG. 6. Second, the kernel portion 116 of the UMS thread 102 may peek at the user portion 118 of the thread to determine whether the user portion 118 is currently being executed. In at least one embodiment, the UMS thread 102 may look at a specific context field of the user portion 118 to determine whether it has been locked for execution, such as execution by a primary thread. As further described below, when the user portion 118 is locked for execution by a primary thread, the corresponding "lock" may include a client identifier (CID) 534 that identifies the particular primary thread. For example, the CID 534 may identify the particular primary thread as the primary thread 106. Thus, once the kernel portion 116 determines that the user portion 118 is currently locked for execution by the primary thread 106 (e.g., switched with the user portion 122), the kernel portion 116 may fire a disassociate APC 536 to the primary thread 106, as identified by the CID 534.

As further shown, the disassociate APC 536 may have occurred when the primary thread 106 is yielding to the UMS thread 102 after it is executed in user mode 114 Accordingly, the primary thread 106 may be in the process of depositing context information regarding the user portion 118 during the occurrence of the disassociate APC 536. For example, this deposit is depicted in FIG. 2a as context saving 210. Thus, during the occurrence of the disassociate APC 536, it is possibly that a portion of the most recently processed context information is already in the memory image associated with the user portion 118, while the remainder of this context information is still present in the processor executing the user portion 122, such as CPU 144. As used herein, the most recently processed context information refers to context information produced by the most recent execution of the primary thread 106 on a CPU. This progression of context saving 210 may be detected by the kernel as the disassociate APC 536 is delivered to the UMS thread 102 in kernel mode 112.

In response to the detection that a yield was in progress when the disassociate APC 536 or a page fault (a type of asynchronous event) occurs, the OS kernel may complete the current context saving 210 so that the user portion 118 contains the states immediately prior to the occurrence of the context saving 210. Once the states of the user portion 118 are saved, the kernel portion 116 may enable the APC 532 to access the user portion 118. For example, the APC 532 may retrieve the context information from the user portion 118. In another example, the APC 532 may modify the context information in the user portion 118. However, in various embodiments, while the context saving 210 may be completed, an instruction pointer (e.g., CPU register) that indicates the progress of the yield process may be reset to a starting point. Accordingly, the instruction pointer may enforce the yield process to restart from the beginning. Thus, when the APC 532 is completed, the context saving 210 from the primary thread 106 to the UMS thread 102 may be re-run.

FIG. 6 illustrates the use of a UMS lock 602 that includes a client identifier (CID) 604 field and lock bit 606 during the switching between a primary thread and a UMS thread, in accordance with various embodiments. As described above, the CID is further used to identify a primary thread that has switched to a UMS thread during the occurrence of an asynchronous procedure call (APC).

As shown, each UMS thread, such as the UMS thread 102, may include a UMS lock 602. In turn, the UMS lock 602 may include a CID field 604 and a lock bit 606. The CID field 604 field is part of a system data structure that identifies each process and thread in the process with a unique identifier. The lock bit 606 may have a default value when the UMS thread 102 is not being executed by the OS kernel in kernel mode 112. For example, but not as a limitation, the default value of the lock bit 606 may be "zero". Moreover, the CID field 604 may also have a default value when a primary thread has not switched to the UMS thread 102. For example, but not as a limitation, the default value of the CID field 604 may also be "zero."

Thus, when the primary thread 106 attempts to switch to the UMS thread 102, it may first check to ensure that the CID field 604 and the lock bit 606 both have their respective default values. In other words, the primary thread 106 may verify that the UMS thread 102 is not currently being executed and no other primary thread has previously switched to the UMS thread 102. If the primary thread 106 is able to verify that both default values are present, the primary thread 106 may replace the default value of the CID field 604 with its own identification 608.

Subsequently, the primary thread 106 may perform a switch with the UMS thread 102. As part of the switch process, the primary thread 106 may replace its user thread descriptor 202 with the user thread descriptor 134 of the UMS thread 102, as described above. Once the primary thread 106 has replaced its user thread descriptor, the scheduler may once again test the lock bit 606 to ensure that it still holds the default value, meaning that it has not been locked by the OS kernel. The reason for the second lock bit test is that the occurrence of an APC following the first lock bit test and during the switch of the primary thread 106 may cause the UMS thread 102 to be executed by the OS kernel. If the second lock bit test indicates that the lock bit 602 still retains its default value, the primary thread 106 may further replace its own registers 204 with the registers 136 of the UMS thread 102. Once the registers are in place, the primary 106 may be executed in user mode 114 in place of the UMS thread 102. Thus, any interruption of the primary thread 106 beyond this point follows the scenario in FIG. 5f since the primary thread 106 is now fully associated with the UMS thread 102. On the other hand, if the lock bit 602 is set, a switch to kernel mode 112 is likely to follow and the primary thread 106 needs to select and switch to another UMS thread.

Exemplary Components

FIG. 7 illustrates selected components of a multi-processor environment 100. The selected components may include computer-program instructions being executed by a computing device, such as the computing device 1200 described in FIG. 12. The selected components may be stored in memory 702 and act on one or more processors 704. The memory 702 may include volatile and nonvolatile memory, removable and non-removable media implemented in any method or technology for storage of information, such as computer-readable instructions, data structures, program modules or other data. Such memory may include, but is not limited to, random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The selected components stored in memory 704 may in the form of program instructions. The program instructions, or modules, may include routines, programs, objects, components, and data structures that perform particular tasks or implement particular abstract data types. The modules may be implemented as software or computer-executable instructions that are executed by one or more processors 702. As shown in FIG. 7, the selected components may include a user mode scheduler 706, a kernel scheduler 708, and a kernel queue 710. However, it will be appreciated that the environment may also include other modules that perform other functions related to thread execution.

The user mode scheduler 706 may be configured to create primary threads and manage UMS threads. The user mode scheduler 706 may be further responsible for exposing UMS thread mechanisms to higher level components in applications, and may also control and implement scheduling policies specific to an application and its instances that uses the threads. The user mode scheduler 706 may include a primary thread API module 712, a UMS thread API module 714, a UMS completion list API module 716, and an accessory API module 718. The primary thread API module 712 may be configured to enable an application to start a new instance of the user mode scheduler 706. The UMS thread API module 714 may be configured to create a new UMS thread, such as the UMS thread 102, from a standard thread, such as the standard thread 110. In one at least one embodiments, the thread API module 714 may convert a standard thread into a new UMS thread by adding a special state, or convert a standard thread into a primary thread and vice versa.

Moreover, the thread API module 714 may enable a primary thread to switch to a UMS thread. Additionally, the thread API module 714 may further enable a first UMS thread to yield to a second UMS thread by providing a hint to the primary thread, such as the primary thread 106, which indicates the UMS thread to execute as a result of the yield. Finally, the thread API module 714 may be implemented to convert a UMS thread or a primary thread back into a standard thread with the removal of the special state.

The UMS completion list API module 716 may be configured to create and manage a UMS completion list, such as the UMS completion list 202. In other embodiments, the UMS completion list API module 716 may withdrawn from the UMS completion list all queued UMS thread user portions. In additional embodiments, the UMS completion list API module 716 may be implemented to delete a UMS completion list.

The accessory API module 718 may be configured to fetch various UMS thread states. For example, the accessory API module 718 may fetch a UMS thread user portion from a UMS completion list so that it may be switched with a user portion of a primary thread for execution on a CPU. In various embodiments, the accessory API module 718 may obtain the latest queued UMS thread from the UMS completion list, as well as obtain the next queued UMS thread. In other embodiments, the accessory API module 718 may be further configured to provide each of the UMS threads with thread information, as well as retrieve thread information from each of the UMS threads.

The kernel scheduler 708 may be configured to schedule the various threads for processing on a CPU. In various embodiments, the scheduling policy of the kernel scheduler 708 may include preemptive, priority-based, and round robin processing. For example, the UMS threads (e.g., the UMS thread 102), the primary threads (e.g., the primary thread 106), as well as the standard threads (e.g., standard process thread 110), may use the services of the kernel scheduler 708 to get appropriately scheduled and pre-empted.

Finally, the kernel queue 710 is a mechanism that may be configured to monitor system operations and registers events and notify appropriate components of changes. The kernel queue 610 may also used by the kernel to control the concurrency level of threads associated with a particular queue. In various embodiments, the kernel queues 710 may wake up the primary thread, such as the primary thread 106, when the user portion 118 of the UMS thread 102 enters into a "parked" state or otherwise blocks in kernel mode 112 (e.g., due to a synchronous wait in a system call or a page fault). This may be accomplished by ensuring that the kernel queues used with the UMS mechanism only allow a concurrency level of a single thread.

Exemplary Processes

Figure 8A:
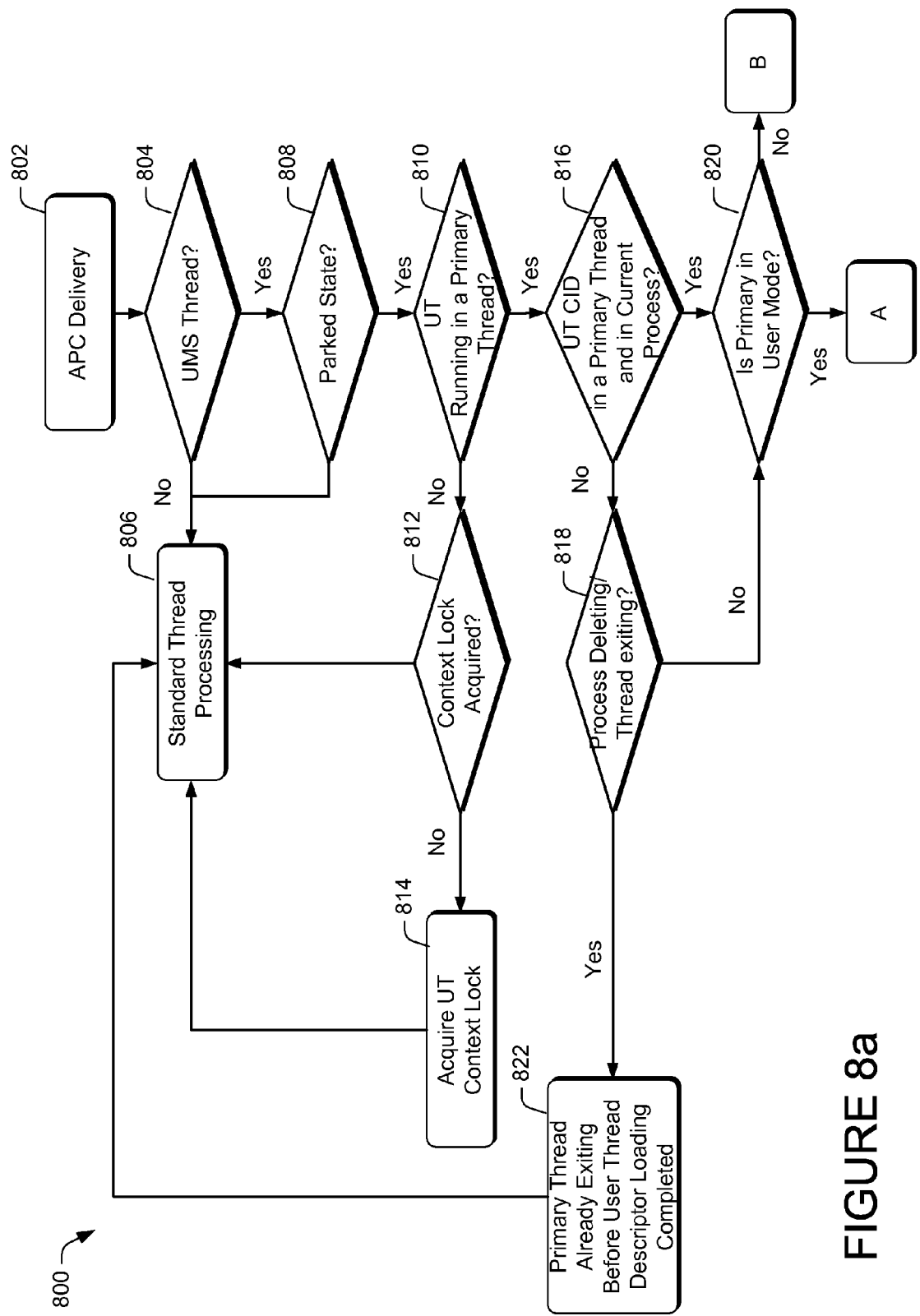
FIGS. 8a and 8b are flow diagrams illustrating an exemplary process for dealing with the occurrence of an asynchronous procedure call (APC) during the execution of a UMS thread, in accordance with various embodiments.
Figure 8B:
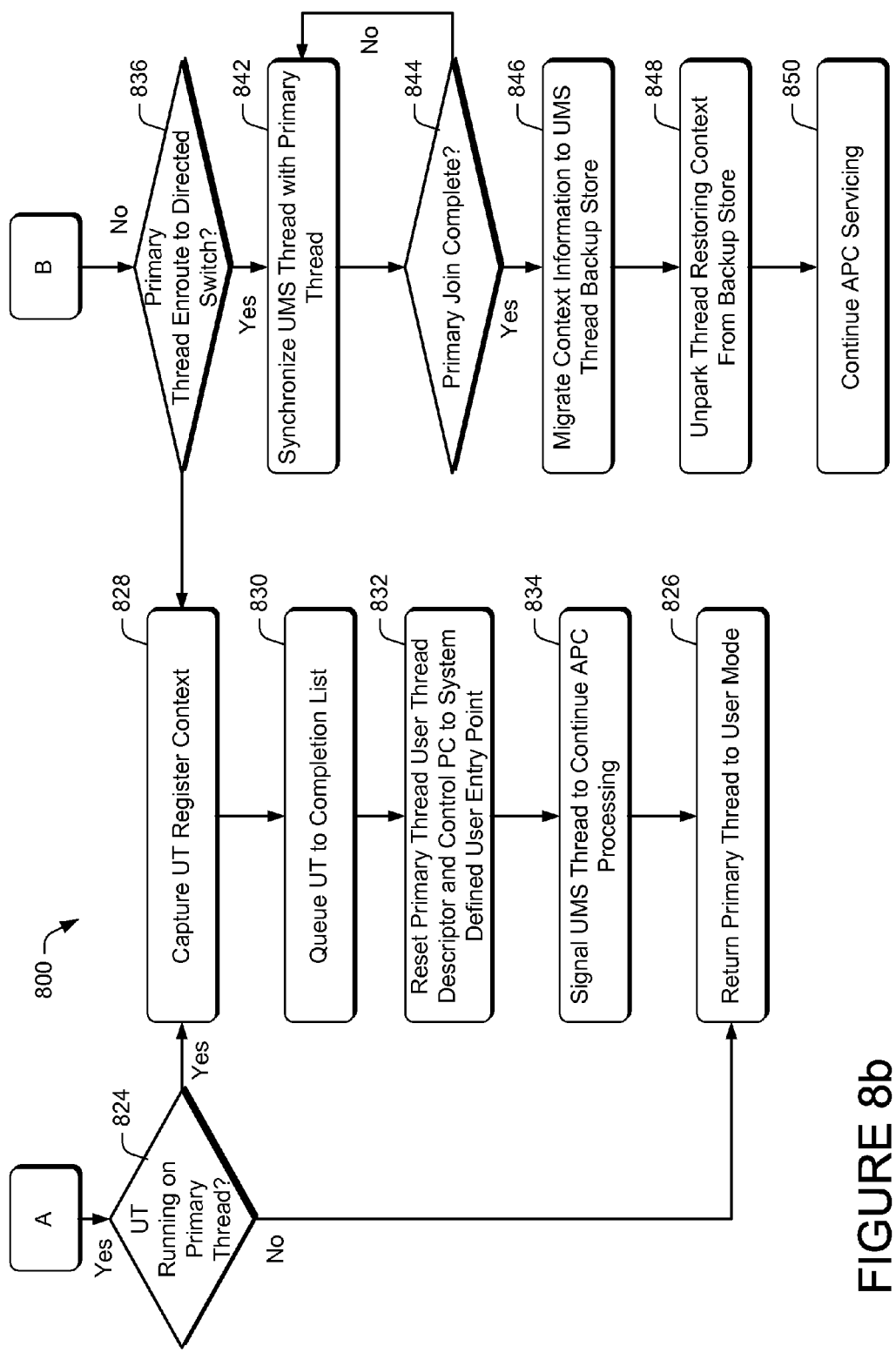
Figure 9:
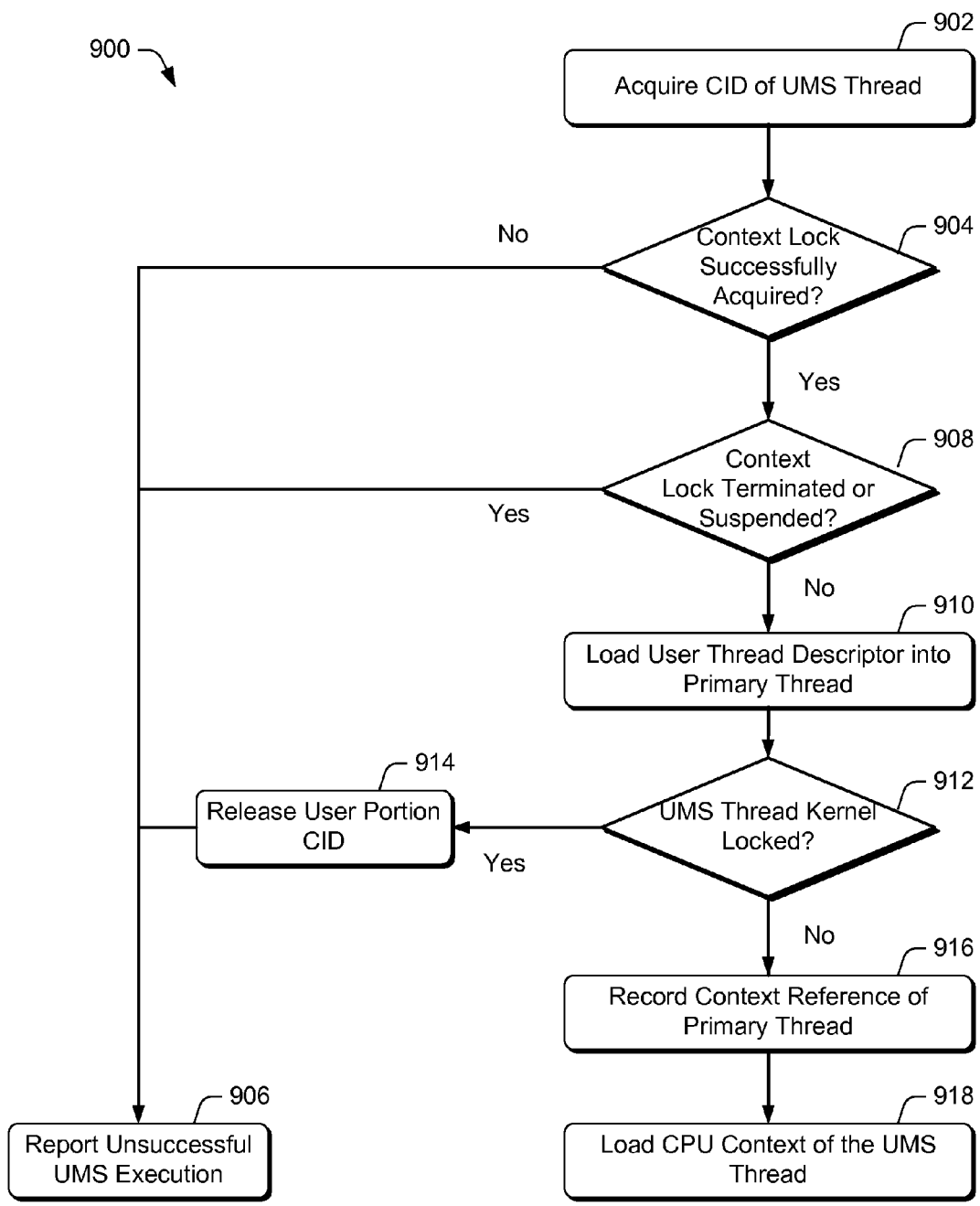
FIG. 9 is a flow diagram illustrating an exemplary process controlling the execution of a UMS thread in user mode, in accordance with various embodiments.
Figure 10:
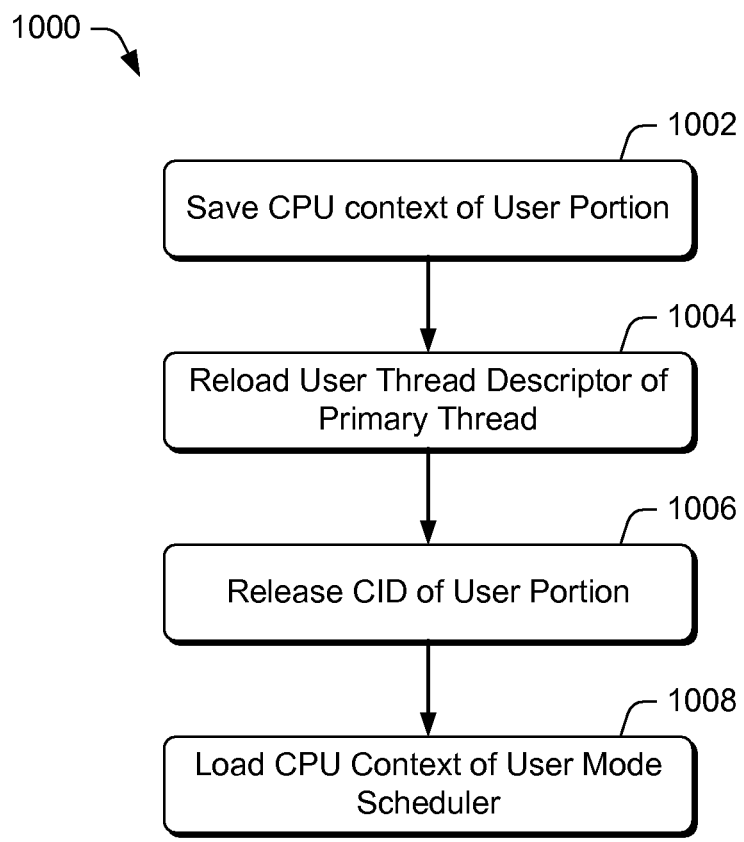
FIG. 10 is a flow diagram illustrating an exemplary process controlling the yield of a UMS thread in user mode, in accordance with various embodiments.

FIGS. 8-10 illustrate exemplary processes that are used during the execution of the user mode schedulable (UMS) threads, in accordance with various embodiments. The exemplary processes in FIGS. 8-10 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary multi-processor environment 100 of FIG. 1, although they may be implemented in other system architectures.

FIGS. 8a and 8b are flow diagrams illustrating an exemplary process 800 for dealing with the occurrence of an asynchronous procedure call (APC) during the execution of a UMS thread, in accordance with various embodiments. At block 802, an APC may be delivered to a thread that is being executed. It will be appreciated that while the process 800 is illustrated using the UMS thread 102 and the primary thread 106, the process 800 may be applicable to other UMS threads and primary threads.

At decision block 804, the OS kernel may determine whether the APC is delivered to a UMS thread, such as the UMS thread 102. If the OS kernel determines that the APC is not delivered to a UMS thread 102 ("no" at decision block 804), the process 800 may proceed to block 806. In various embodiments, the APC may have been delivered to a standard thread, such as standard thread 100. At block 806, the APC may be processed as part of standard thread processing, such as the processing of a NT thread. However, if the OS kernel determines that the APC is delivered to a UMS thread ("yes" at decision block 804), the process 800 may proceed to decision block 808. In various embodiments, the APC may be delivered to the kernel portion 116 of a UMS thread 102.

At decision block 808, the OS kernel may determine whether the kernel portion 116 of the UMS thread 102 is in a parked state. In various embodiments, as described above, once the execution of a user portion of the UMS thread 102 is completed in kernel mode 112, the kernel portion 116 of the UMS thread 102 may place itself in a "parked" state (i.e., a type of ready waiting state that enables the kernel portion 116 to wait for the occurrence of a directed switch). Thus, conversely, the fact the kernel portion 116 is not in a parked state indicates that the kernel portion 116 is still being executed.

If the OS kernel determines that the kernel portion 116 is not in a parked state ("no" at decision block 808), the process 800 may proceed to block 806. At block 806, the APC may be processed as part of standard thread processing, such as the processing of a NT thread. However, if the OS kernel determines that the kernel portion 116 is in a parked stated ("yes" at decision block 808), the process 800 may proceed to decision block 810.

At decision block 810, the OS kernel may determine whether the user portion 118 of the UMS thread 102 is running in the primary thread 106. For example, the user portion 118 may be switched with the user portion 122 of the primary thread 106 for execution in user mode 114. If the OS kernel determines that the user portion 118 is not running in primary thread 106 ("no" at decision block 810), the process 800 may proceed to decision block 812.

At decision block 812, the OS kernel may determine whether the UMS thread 102 has acquired a context lock. In various embodiments, the context lock may be in the form of a placement of a non-default value into the lock bit 606 of the UMS lock 602 (FIG. 6). If the OS kernel determines that the UMS thread 102 has acquired a context lock ("yes" at decision block 812), which indicates that the UMS thread 102 is actually being executed in kernel mode 112, the process 800 may proceed to block 806.

At block 806, the APC may be processed as part of standard thread processing, such as the processing of a NT thread. However, if the OS kernel determines that the UMS thread has not acquired a context lock ("no" at decision block 812), the process may proceed to block 814.

At block 814, the UMS thread 102 may acquired a context lock to indicate that it is being executed in kernel mode 112 (since the UMS thread 102 is not being executed by a primary thread). Subsequently, the process 800 may proceed to block 806. At block 806, the APC may be processed as part of standard thread processing, such as the processing of a NT thread.

Returning to decision block 810, if the OS kernel determines that the user portion 118 is running in primary thread 106 ("yes" at decision block 810), the process 800 may proceed to decision block 816.

At decision block 816, the OS kernel may determine whether the identification 608 (FIG. 6) of the use portion 118 has been placed into the CID field 604 (FIG. 6) of the primary thread 106 as part of the current process. If the OS kernel determines that the identification 608 has not been placed into the CID field 604 as part of the current process ("no" at the decision block 816), the process 800 may proceed to decision block 818. However, if the OS kernel determines that the identification 608 has been placed into the CID field 604 of the primary thread 106 as part of the current process, ("yes" at decision block 816), the process 800 may proceed to decision block 820.

Returning to decision block 818, the OS kernel may determine whether the current process is being deleted from the system. If the OS kernel determines that the current process is being deleted ("yes" at decision block 818), the process 800 may proceed to block 822.

At block 822, the OS kernel may determine that the primary thread 106 has already exited user mode 114 prior to the user thread descriptor loading to the primary thread 106 is completed as part of a UMS switch. Subsequently, the process 800 may proceed to block 806.

At block 806, the APC may be processed as part of standard thread processing, such as the processing of a NT thread. Returning to decision block 818, if the OS kernel determines that the current process is not a deletion process ("no" at decision block 818), the process may proceed to decision block 820.

At decision block 820, a user mode scheduler, such as the user mode scheduler 206, may determine whether the primary thread 106 is in user mode 114. If the user mode scheduler determines that the primary thread 106 is in user mode 114 ("yes" at decision block 820), the process 800 may proceed to decision block 824 in FIG. 8b.

At decision block 824, the user mode scheduler may determine whether the user portion 118 is running on the primary thread 106. In other words, the user mode scheduler may determine whether the portion 122 of the primary thread 106 may have switched with the user portion 118 for execution in user mode 114. If the user mode scheduler determines that the user portion 118 is not running on the primary thread 106 ("no" at decision block 820), the process may proceed to block 826. At block 826, the user mode scheduler 102 may return the primary thread 106 to user mode 114.

However, if the user mode scheduler determines that the user portion 118 is running on the primary thread 106 ("yes" at decision block 824), the process 800 may proceed to block 828.

At block 828, the register context associated with the user portion 118 may be captured. In various embodiments, the captured registered context may include both asynchronous and synchronous contexts. At block 830, the user portion 118 may be queued to a completion list, which is described above. At block 832, the user thread descriptor 202 of the primary thread 106 and the control procedure call (PC) may be reset to system-defined user entry points. In various embodiments, the primary thread 106 may return the context information from its kernel portion 120 to the user portion 118 of the UMS thread 102. At block 834, the OS kernel may signal the UMS thread 102 to continue APC processing. At this point, the process 800 may also continue to block 826, where the user mode scheduler 102 may return the primary thread 106 to user mode 114.

Returning to decision block 820, if the user mode scheduler determines that the primary thread 106 is not in user mode 114 ("no" at decision block 820), the process may proceed to decision block 836.

At decision block 836, the OS kernel may determine whether the primary thread 106 is the middle of a directed switch with the UMS thread 102. In other words, the kernel portion 120 of the primary thread 106 is being switched with the user portion 118 of the UMS thread 102. If the OS kernel determines that a directed switch is not taking place ("no" at decision block 836), the process 800 may proceed to block 828, where the process 800 will progress as previously described.

However, if the OS kernel determines that a directed switch is taking place ("yes" at decision block 836), the process 800 may proceed to block 842. At block 842, the UMS thread 102 may be synchronized with the primary thread 106. At decision block 844, the OS kernel may determine whether the joining of the primary thread 106 to the UMS thread 102 is completed. In other words, the OS kernel may determine whether the wait for the primary thread 106 to complete the transfer of states from the UMS thread 102 is finished. If the OS kernel determines that the joining of the primary thread 106 is completed ("yes" at decision block 844), the process 800 may further proceed to block 846. However, if the OS kernel determines that the joining of the primary thread 106 is not complete ("no" at decision block 846), the process 800 may loop back to block 842, where additional synchronization may be performed. This looping may be performed until synchronization is complete.

At block 846, the context information from the primary thread 106 may be migrated to a backup store of the UMS thread 102. In various embodiments, as described in FIG. 5d, the context information from the user portion 120 may be "pulled" into staging area 524 of the kernel portion 116. At block 848, the UMS thread 102 may be "unparked," that is, waken up from a waiting state. Once awoken, the context information of the UMS thread 102 may be replaced with the context information from the backup store. At block 850, the OS kernel may continue APC servicing. In some embodiments, the APC may be executed on the UMS thread 102 with the replaced context information.

FIG. 9 is a flow diagram illustrating an exemplary process 900 controlling the execution of a UMS thread in user mode, in accordance with various embodiments. It will be appreciated that while the process 900 is illustrated using the UMS thread 102 and the primary thread 106, the process 900 may be applicable to other UMS threads and primary threads.

At block 902, the user mode scheduler may acquire the client identifier (CID), such as CID field 604 of a UMS thread 102. In various embodiments, the CID field 604 may be part of a UMS lock 602 that further includes a lock bit 606.

At decision block 904, it may be determined whether the context lock of the UMS thread 102 is successfully acquired by the user mode scheduler. In other words, it is determined whether the user mode scheduler is able to acquire the lock bit 606 of the UMS lock 902. If it is determined that the user mode scheduler is not able to acquire the context lock ("no" at decision block 904), the process 900 may proceed to block 906. At block 906, the user mode scheduler may report an unsuccessful UMS execution to a caller. However, if it is determined that the user mode scheduler is able to acquire the context lock ("yes" at decision block 904), the process 900 may proceed to decision block 908.

At decision block 908, the user mode scheduler may determine whether the context is terminated or suspended. If the user mode scheduler determines that the context is terminated or suspended ("yes" at decision block 906), the process 900 may proceed to block 906. At block 906, the user mode scheduler may report an unsuccessful UMS execution to the caller. However, if the user mode scheduler determines that the context is not terminated or suspended, ("no" at decision block 906), the process 900 may proceed to block 910.

At block 910, the primary thread 106 may load to the user thread descriptor 134 from the UMS thread 102. In various embodiments, the primary thread 106 may load the user thread descriptor of the UMS thread 102 using the pointers described in FIG. 3.

At decision block 912, the user mode scheduler may determine whether the UMS thread 102 is kernel locked. In various embodiments, the UMS thread 102 is kernel locked if the lock bit 606 indicates that the UMS thread 102 is not of interest to the kernel 112. For example, in at least one embodiment, the lock bit 606 may have a default value if the UMS thread 102 is not locked by the OS kernel. If the user mode scheduler determines that the UMS thread 102 is kernel locked ("yes" at decision block 912), the process 900 may proceed to block 914. At block 914, the primary thread 106 may release the CID field 604 of the UMS thread 102. In other words, the identification 608 of the primary thread 106 may be removed from the CID field 604 of the UMS thread 102. Subsequently, the process 900 may proceed to block 906. At block 906, the user mode scheduler may report an unsuccessful UMS execution to the OS kernel.

However, if the user mode scheduler determines that the UMS thread 102 is not kernel locked ("no" at decision block 912), the process may proceed to block 916. At block 916, the UMS thread 102 may record the context reference of the primary thread. In other words, the identification 608 (FIG. 6) of the primary thread 106 may be recorded in the CID field 604 field of the UMS thread context 102. At block 918, the CPU context of the UMS thread 102, that is, the user portion 118, may be loaded for execution in user mode 114.

FIG. 10 is a flow diagram illustrating an exemplary process 1000 controlling the yield of a UMS thread in user mode, in accordance with various embodiments. It will be appreciated that while the process 1000 is illustrated using the UMS thread 102 and the primary thread 106, the process 1000 may be applicable to other UMS threads. It will be appreciated that a yield may be performed by a UMS thread 102 in user mode 114 to give up its execution via the primary thread 106 so that the primary thread 106 may provide execution to another UMS thread.

At block 1002, the CPU context of the UMS thread 102, as present in the user portion 122 of the primary thread 106, may be saved back into the user portion 118 of the UMS thread 102. At block 1004, the user thread descriptor 134 of the primary thread 106 may be reloaded. In other words, the user thread descriptor 134 of primary thread 106 may be reset to its original state.

At block 1006, the primary thread 106 may release the CID field 604 of the UMS thread 102. In other words, the identification 608 of the primary thread 106 may be removed from the CID field 604 of the UMS thread 102 context. At block 1008, the user mode scheduler may load a new CPU context into the primary thread 106.

Exemplary Computing Device

Figure 11:
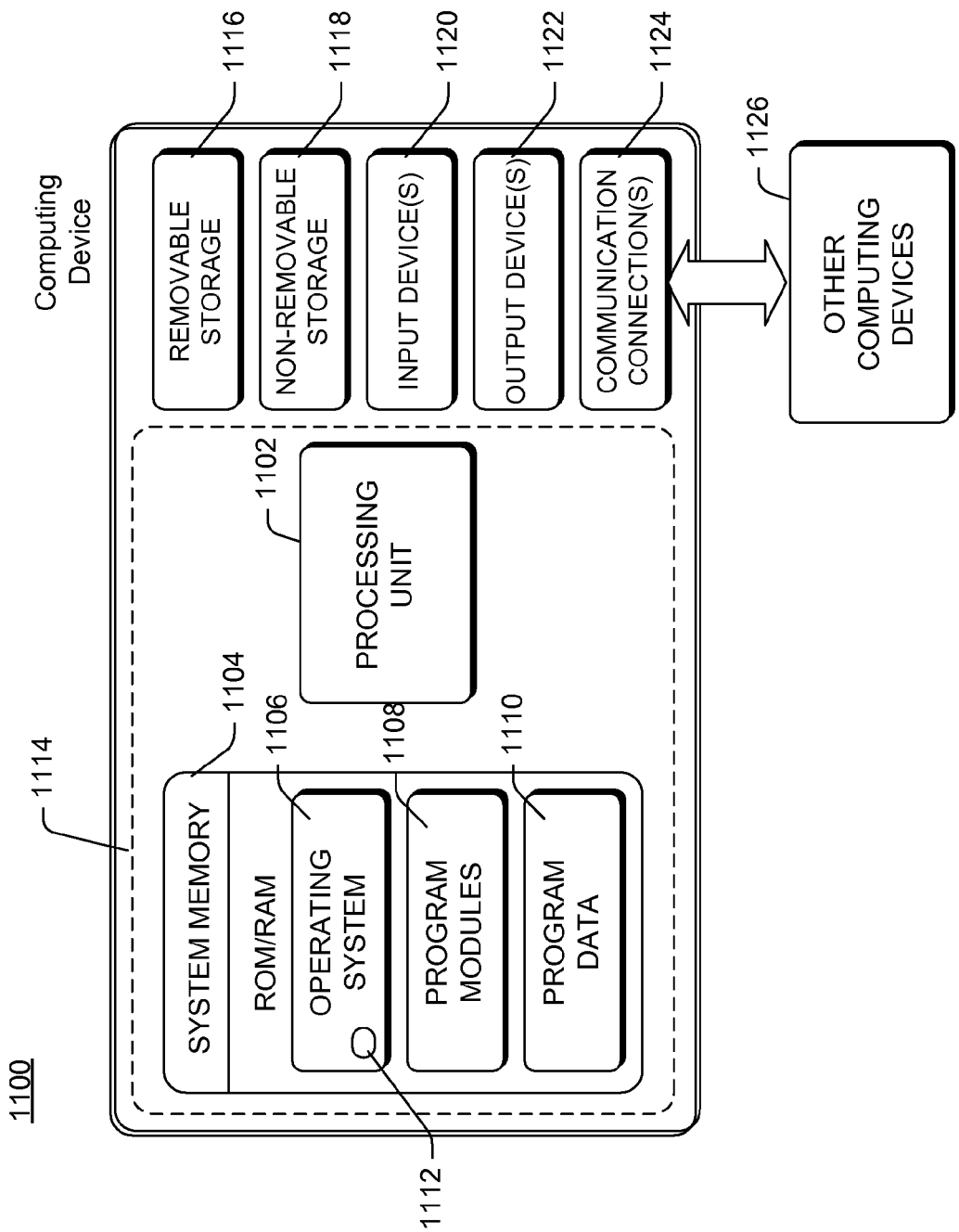
FIG. 11 is a block diagram illustrating a representative computing device. The representative device may be a part of a multi-processor environment, in accordance with various embodiments.

FIG. 11 illustrates a representative computing device 1100 that may be used to implement the directed switch and optimization techniques and mechanisms described herein. For example, the multi-processor environment 100 (FIG. 1) may be implemented on the representative computing device 1100. However, it is readily appreciated that the various embodiments of the directed switch implementation and support techniques and mechanisms may be implemented in other computing devices, systems, and environments. The computing device 1100 shown in FIG. 11 is only one example of a computing device and is not intended to suggest any limitation as to the scope of use or functionality of the computer and network architectures. Neither should the computing device 1100 be interpreted as having any dependency or requirement relating to any one or combination of components illustrated in the example computing device.

In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1106, one or more program modules 1108, and may include program data 1110. The operating system 1106 include a component-based framework 1112 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 1100 is of a very basic configuration demarcated by a dashed line 1114. Again, a terminal may have fewer components but will interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1116 and non-removable storage 1118. Computer storage media may include volatile and nonvolatile, removable and non-removable media implemented in any method or technology for storage of information, such as computer readable instructions, data structures, program modules, or other data. System memory 1104, removable storage 1116 and non-removable storage 1118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1120 such as keyboard, mouse, pen, voice input device, touch input device, etc. Output device(s) 1122 such as a display, speakers, printer, etc. may also be included. These devices are well known in the art and are not discussed at length here.

Computing device 1100 may also contain communication connections 1124 that allow the device to communicate with other computing devices 1126, such as over a network. These networks may include wired networks as well as wireless networks. Communication connections 1124 are one example of communication media. Communication media may typically be embodied by computer readable instructions, data structures, program modules, etc.

It is appreciated that the illustrated computing device 1100 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The use of directed switches for primary threads and the UMS thread may enable pure user mode switching. The use of pure user mode switching may provide an architecture and/or platform for applications, such as high performance enterprise applications, with the ability to better control thread execution and concurrency. Moreover, the use of directed switches on a multi-processor platform may enable applications to scale efficiently. With the use of directed switches and support mechanisms described herein, applications may have the ability to utilize all system services and/or application programming interface (API) on UMS threads transparently, that is, in the same manner as standard NT threads without compatibility issues.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

We claim:

1. A method, comprising:

receiving an original asynchronous procedure call (APC) on a kernel portion of a user mode schedulable (UMS) thread during an execution of the UMS thread, the UMS thread including a UMS thread user portion for execution in the user mode and a UMS thread kernel portion for execution in a kernel mode that are independently managed by an application, in which execution switch between the UMS thread user portion and the UMS thread kernel portion during the execution of the UMS thread is performed via a primary thread that exchange context information with the UMS thread, the primary thread having a primary thread user portion and a primary thread kernel portion that are managed in unison by the application;

determining a status of the UMS thread that is being processed in a multi-processor environment, wherein the status includes one of the UMS thread executing in kernel mode, the UMS thread executing via the primary thread in user mode, the UMS thread engaging in a context migration with the primary thread, the UMS thread being idle, the UMS thread engaging in a context loading with the primary thread, or the UMS thread engaging in a context saving with the primary thread; and processing the original APC on the UMS thread based on the status of the UMS thread.

2. The method of claim 1, wherein the primary thread includes first context information from a CPU, and the UMS thread includes second context information from a memory.

3. The method of claim 1, wherein the determining includes determining that the UMS thread is executing in kernel mode, and wherein the execution further comprise executing the original APC on the UMS thread kernel portion to one of retrieve or modify context information of the kernel portion.

4. The method of claim 1, further comprising inserting an identifier (ID) of the primary thread into a client identifier (CID) field of the UMS thread prior to executing the UMS thread via the primary thread in user mode, and wherein the determining includes determining that the UMS thread is associated with the primary thread based on the CID.

5. The method of claim 1, wherein the determining includes determining that the UMS thread is idle, and wherein the processing further comprises:
- placing a lock on the UMS thread user portion when the UMS thread is not being executed, the lock preventing the UMS thread from being executed in one of kernel mode or user mode; and
- executing the original APC on the UMS thread user portion to one of retrieve or modify context information of the UMS thread user portion.

6. The method of claim 1, wherein the determining includes determining that the UMS thread is executing via the primary thread in user mode, and wherein the processing further comprises:
- firing a disassociate APC at the primary thread to cause the primary thread to abandon execution in user mode and return to kernel mode;
- returning context information from the primary thread kernel portion to the UMS thread user portion; and
- executing the original APC on the UMS thread user portion to one of retrieve or modify the context information of the UMS thread user portion.

7. The method of claim 1, wherein the determining includes determining that the UMS thread is engaging in a context migration with the primary thread, and wherein the processing further comprises:
- pulling new context information from the primary thread kernel portion to a staging area in the UMS thread kernel portion via an original APC; and
- executing the original APC on the UMS thread user portion to one of retrieve or modify the new context information of the UMS thread kernel portion.

8. The method of claim 1, wherein the determining includes determining that the UMS thread is engaging in a context migration with the primary thread, and wherein the processing further comprises:
- providing an indicator to signal that the primary thread is ready to transfer new context information to the UMS thread in response to an disassociate APC that is generated based on an original APC;
- pulling new context information from the primary thread kernel portion to a staging area in the UMS thread kernel portion the an original APC;
- replacing old context information of the UMS thread kernel portion with the new context information in the staging area; and
- executing the original APC on the UMS thread user portion to one of retrieve or modify the new context information of the UMS thread kernel portion.

9. The method of claim 1, wherein the determining includes determining that the UMS thread is engaging in a context loading with the primary thread, and wherein the processing further comprises:
- completing a transfer of context information from the UMS thread user portion to the primary thread user portion that is in progress in response to a disassociate APC, the disassociate APC being generated based on an original APC; and
- executing the original APC on the UMS thread user portion to one of retrieve or modify the context information of the UMS thread user portion.

10. The method of claim 1, wherein the determining includes determining that the UMS thread is engaged in context saving with the primary thread, and wherein the processing further comprises:
- completing a replacement of first context information in the UMS thread user portion with second context information from the primary thread user portion in response to a disassociate APC, the disassociate APC being generated based on an original APC;
- executing the original APC on the UMS thread user portion to one of retrieve or modify the first context information of the UMS thread user portion; and
- repeating the replacement of the first context information in the UMS thread user portion with the second context information from the primary thread user portion.

11. The method of claim 1, wherein the determining includes determining that the UMS thread is engaged in context saving with the primary thread as a result of a page fault, and wherein the processing further comprises:
- terminating a replacement of first context information in the UMS thread user portion with second context information from the primary thread user portion in response to a disassociate APC, the disassociate APC being generated based on an original APC;
- restoring the first context information of the UMS user portion to states prior to the replacement;
- executing the original APC on the UMS thread user portion to one of retrieve or modify the first context information of the UMS thread user portion; and
- processing the primary thread kernel portion in kernel mode instead of the primary thread user portion in user mode as a result of the page fault.

12. The method of claim 1, wherein the UMS thread includes a data bit to indicate that the UMS thread is executing in the kernel mode, and wherein the determining includes determining that the UMS thread is executing in the kernel mode based on a value of the data bit.

13. The method of claim 1, wherein the UMS thread includes an identifier field to indicate that the UMS thread is switched with the primary thread, and wherein the determining includes determining that the UMS thread is switched with the primary thread based on a value of the identifier field.

14. A computer readable memory storing computer-executable instructions that, when executed, cause one or more processors to perform acts comprising:
- receiving an original asynchronous procedure call (APC) on a kernel portion of a user mode schedulable (UMS) thread;
- determining that the UMS thread is engaging in a context migration with a primary thread;
- providing an indicator to signal that the primary thread is ready to transfer new context information to the UMS thread in response to an disassociate APC that is generated based on an original APC;
- pulling new context information from a primary thread kernel portion to a staging area in a UMS thread kernel portion of the an original APC;
- replacing old context information of the UMS thread kernel portion with the new context information in the staging area; and
- executing the original APC on a UMS thread user portion to one of retrieve or modify the new context information of the UMS thread kernel portion.

15. The computer readable memory of claim 14, wherein the UMS thread includes a data bit indicating that the UMS thread is executing in a kernel mode when the UMS thread portion is executing in the kernel mode.

16. The computer readable memory of claim 14, wherein the UMS thread includes an identifier field to indicate that the UMS thread is switched with the primary thread when a switch occurs.

17. A computer readable memory storing computer-executable instructions that, when executed, cause one or more processors to perform acts comprising:
- receiving an original asynchronous procedure call (APC) on a kernel portion of a user mode schedulable (UMS) thread;
- determining that the UMS thread is engaged in context saving with a primary thread;
- completing a replacement of first context information in a UMS thread user portion with second context information from a primary thread user portion in response to a disassociate APC, the disassociate APC being generated based on an original APC;
- executing the original APC on the UMS thread user portion to one of retrieve or modify the first context information of the UMS thread user portion; and
- repeating the replacement of the first context information in the UMS thread user portion with the second context information from the primary thread user portion.

18. The computer readable memory of claim 17, wherein the UMS thread includes a data bit indicating that the UMS thread is executing in a kernel mode when the UMS thread portion is executing in the kernel mode.

19. The computer readable memory of claim 17, wherein the UMS thread includes an identifier field to indicate that the UMS thread is switched with the primary thread when a switch occurs.

* * * * *